(12) United States Patent
Doi et al.

(10) Patent No.: US 7,779,149 B2
(45) Date of Patent: Aug. 17, 2010

(54) COMPOUND CONTENTS DELIVERY METHOD AND DELIVERY SYSTEM

(75) Inventors: Kazumi Doi, Kawasaki (JP); Masami Mizutani, Kawasaki (JP); Kimihiko Kazui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1475 days.

(21) Appl. No.: 10/779,744

(22) Filed: Feb. 18, 2004

(65) Prior Publication Data

US 2004/0267908 A1 Dec. 30, 2004

(30) Foreign Application Priority Data

Jun. 27, 2003 (JP) .............................. 2003-185304

(51) Int. Cl.
*G06F 15/16* (2006.01)
*G06F 17/00* (2006.01)
(52) U.S. Cl. .................. 709/236; 709/201; 709/202; 709/203; 709/217; 709/218; 709/219; 715/209; 715/210
(58) Field of Classification Search ......... 709/201–203, 709/217–219; 715/209–210
See application file for complete search history.

(56) References Cited

U.S. PATENT DOCUMENTS

| | | | | |
|---|---|---|---|---|
| 6,480,234 | B1 * | 11/2002 | Sasaki et al. | 348/512 |
| 6,584,466 | B1 * | 6/2003 | Serbinis et al. | 707/10 |
| 7,162,451 | B2 * | 1/2007 | Berger et al. | 705/51 |
| 2003/0025832 | A1 * | 2/2003 | Swart et al. | 348/461 |
| 2003/0079183 | A1 * | 4/2003 | Tada et al. | 715/515 |

FOREIGN PATENT DOCUMENTS

| | | |
|---|---|---|
| JP | 10-254850 | 9/1998 |
| JP | 2000-235652 | 8/2000 |
| JP | 2002-297495 | 10/2002 |
| WO | WO 01/26378 | 4/2001 |
| WO | WO 03/052626 | 6/2003 |

OTHER PUBLICATIONS

Wu et al.; "Segment-Based Proxy Caching of Multimedia Streams"; IBM T. J. Watson Research Center; May 2001.*
Yoshimura et al., "Content Delivery Network Architecture for Mobile Streaming Service Enabled by SMIL Modification", IEICE Transactions on Communications, vol. E86-B, No. 6, pp. 1778-1787, Jun. 2003.

* cited by examiner

*Primary Examiner*—Vivek Srivastava
*Assistant Examiner*—Lin Liu
(74) *Attorney, Agent, or Firm*—Staas & Halsey LLP

(57) ABSTRACT

The present invention relates to a compound contents delivery method capable of reducing the network transmission quantity and of distributing the system processing load. The method according to the present invention comprises a compound contents element acquisition step of, in each of contents servers, acquiring a compound contents element undergoing a conversion into an encoding format for a portable terminal in corresponding relation to a contents portion which is an object of a fetching instruction in a contents portion fetching instruction step to return it to an intermediate apparatus and a production step of, in the intermediate apparatus, combining the compound contents elements returned from the contents servers according to time series on the basis of instruction information from a management server to produce compound contents oriented to the portable terminal.

16 Claims, 18 Drawing Sheets

FIG. 2

```
<seq>
  <par dur=" 10s" >
    <video type=" WMV" src=" http://www.aaa.co.jp/av1.mpg" beginClip=" 5s " />
    <audio type=" WMA" src=" http://www.bbb.co.jp/av2.mpg" beginClip=" 10s" />
  </par>
  <par dur=" 20s" >
    <video type=" MPEG-4 Video" src=" http://www.aaa.co.jp/av1.mpg" beginClip=" 50m" />
    <audio type=" MPEG-1 Audio" src=" http://www.ccc.co.jp/av3.mpg" beginClip=" 30m" />
  </par>
</seq>
```

FIG. 3

| SEGMENT ID | URL | MEDIA | REFERENCE START TIME | REFERENCE PERIOD |
|---|---|---|---|---|
| 1 | http://www.aaa.co.jp/av1.mpg | WMV | 5s | 10s |
| 2 | http://www.bbb.co.jp/av2.mpg | WMA | 10s | 10s |
| 3 | http://www.aaa.co.jp/av1.mpg | MPEG-4 Video | 50m | 20s |
| 4 | http://www.ccc.co.jp/av3.mpg | MPEG-4 Audio | 30m | 20s |

| SERVER ID | URL | MEDIA | SEGMENT MANAGEMENT TABLE ID | ... |
|---|---|---|---|---|
| 1 | http://www.aaa.co.jp/av1.mpg | Audio | 1 | ... |
| 2 | http://www.bbb.co.jp/av2.mpg | Video | 2 | ... |
| ... | ... | ... | ... | ... |
| n | http://www.aaa.co.jp/avm.mpg | Audio | N | ... |
| ... | ... | ... | ... | ... |

FIG. 7

| SEGMENT MANAGEMENT TABLE ID | SEGMENT ID | Cutin&cutout | ENCODING FORMAT | ... |
|---|---|---|---|---|
| N | #1 | [0, 15] | WMA | ... |
| | ... | ... | ... | ... |
| | #m-1 | [13, 18] | Mpeg-1 Audio | ... |
| | #m | [15, 39] | Mpeg-1 Audio | ... |
| | ... | ... | ... | ... |

| CONTENTS ID | URL | MEDIA | SEGMENT MANAGEMENT TABLE ID | |
|---|---|---|---|---|
| 1 | http://www.aaa.co.jp/av1.mpg | Audio | 1 | ⋮ |
| 2 | http://www.bbb.co.jp/av2.mpg | Video | 2 | ⋮ |
| ⋮ | ⋮ | ⋮ | ⋮ | ⋮ |
| m | http://www.aaa.co.jp/avm.mpg | Audio | N | ⋮ |
| ⋮ | ⋮ | ⋮ | ⋮ | ⋮ |

| CONTENTS A TIME | SEGMENT ID | URL | Cutin&Cutout TIME OF SEGMENT | Cutin&Cutout TIME REQUESTED | ... |
|---|---|---|---|---|---|
| [0, 15] | 1 | | [5, 20] | [10, 20] | ... |
| [15, 35] | 2 | | [60, 80] | [63, 73] | ... |
| [35, 55] | 3 | | [0, 20] | [7, 17] | ... |

| CONTENTS B PRESENTATION TIME | CONTENTS A TIME |
|---|---|
| [0, 10] | [0, 15] |
| [10, 20] | [15, 35] |
| [20, 30] | [35, 55] |

FIG. 21

| ID | URL | MEDIA | SEGMENT MANAGEMENT TABLE ID | METADATA TABLE ID |
|---|---|---|---|---|
| 1 | http://www.ccc.co.jp/av1.mpg | Audio | 1 | 1 |
| 2 | http://www.ddd.co.jp/av2.mpg | Video | 2 | 2 |
| ... | ... | ... | ... | ... |
| m | http://www.fff.co.jp/avm.mpg | Video | M | M |
| ... | ... | ... | ... | ... |

2a'-31

COMPOUND CONTENTS DELIVERY METHOD AND DELIVERY SYSTEM

BACKGROUND OF THE INVENTION

1) Field of the Invention

The present invention relates to compound contents delivery method and delivery system, and more particularly to compound contents delivery method and delivery system suitable for use in a portable-terminal-oriented streaming system or a system designed to carry out the portable-terminal-oriented network picture editing.

2) Description of the Related Art

In recent years, with the development of network environments such as the internet, efforts have been in progress to construct a system which carries out the information interchange or information offer between computers connected to a network.

For example, the employment of SMIL (Synchronized Multimedia Integration Language) of W3C (World Wide Web Consortium) enables offering the compound contents (or content) for arranging a presentation through partial reference and time series combination of a plurality of contents distributed to a plurality of servers on a network. For example, such compound contents are made by means of digest-editing in which a plurality of motion picture files or a plurality of audio files are partially connected to each other.

An offer service on the aforesaid compound contents is an information offer service to common personal computers. Meanwhile, with the rapid progress of the construction of a system which carries out the information offer to portable terminals, a further requirement for the offer to portable terminals is on the increase.

However, for delivering compound contents to a portable terminal, there is a need to convert the contents as an information source to be managed in a server on a network into a data format to which the portable terminal can make reference.

That is, in comparison with a common personal computer, the portable terminal has a smaller data size processible as image data and the like and employs a different encoding method, and for the regeneration of most of personal-computer-oriented contents in the portable terminal, there is a need to make a conversion on the encoding method and others.

In addition, simultaneously with this, for making partial reference to the multimedia contents in which information (media) with various forms, such as character, still picture, motion picture and voice, are integrated with each other while keeping the time arrangement, there is a need to extract a time zone to which reference is made with respect to this multimedia contents.

FIG. 22 is an illustration of an example of a compound contents delivery system 100 designed to offer compound contents to portable terminals as mentioned above. In FIG. 22, the compound contents delivery system 100 is made up of a contents server 101, a converting apparatus 103, a management server 102 and a portable terminal 104.

In this configuration, the contents server 101 includes a contents storage unit 101a for storing the contents, and a control unit 101b for controlling the fetching of the contents from the contents storage unit 101a on the basis of a delivery request.

The management server 102 is connected through a network 100a to the portable terminal 104 to manage the delivery of the contents to the portable terminal 104 and is made to instruct the converting apparatus 103 of the substance of the compound contents, to be produced, through the use of conversion instruction information.

The converting apparatus 103 is connected through a network 100b to the contents server 101 and locally connected to the management server 102 for mediating the supply of the contents from the contents server 101 to the management server 102, and is composed of a local storage unit 103a and a control unit 103b.

That is, the control unit 103b of the converting apparatus 103 once puts, on the basis of conversion instruction information from the management server 102, a plurality of kinds (in FIG. 22, n+1 kinds from #1 to #n+1) of integrated contents including a time zone to be delivered to the portable terminal 104 from the contents server 101 in the local storage unit 103a.

Moreover, after the partial contents are extracted from the time zone to be referenced and the conversion is made on the data format, the partial contents are time-combined to produce compound contents which in turn, are stored as one file in the local storage unit 103a. The file forming the compound contents is transferred through the management server 102 to the portable terminal 104, thereby delivering the compound contents to the portable terminal 104.

That is, in the contents delivery system 100 shown in FIG. 22, the contents to be referenced in the portable terminal 104, together with a portion to be non-referenced, are picked up through the network 100b and, through the local processing in the converting apparatus 103, the time zone to be referred is then extracted and the conversion of the encoding format is made, thereby storing it in one file.

Among the conventional documents related to the present invention, there are Japanese Patent Laid-Open Nos. 2002-297495, 2000-235652 and HEI 10-254850.

However, in the aforesaid system shown in FIG. 22, in a case in which the contents are fetched by the converting apparatus 103, since the non-referenced portion is together picked up and the time zone of the contents to be referenced is extracted in the converting apparatus 103, there is a problem in that the uselessness occurs in the network transmission. That is, there is a need to fetch the contents including the non-referenced time zone from the server forming the location of the information service, which causes the useless network transmission.

On the other hand, as the techniques for fetching only the portion to be referenced, there have been known two means of NFS (data acquisition according to file offset) and streaming C/S processing (data acquisition according to time designation). However, these techniques is not designed to make the conversion of the encoding format and the like and, hence, difficulty is experienced in making the conversion of the encoding format and the like for the regeneration in a portable terminal.

In general, the personal-computer-oriented motion picture contents have a high fineness (high rate) while the motion picture regenerable in the portable terminal is comparatively at a low rate and, hence, the converting apparatus 103 is required to convert the high-rate data transmitted through the network 100b into low-rate data. Therefore, even if the contents server 101 fetches only the referenced portion through the use of the aforesaid technique, since the transmission of the high-rate data non-regenerated in the portable terminal takes place, there is still a problem in that the useless network transmission occurs.

The aforesaid documents do not provide a technique of solving the uselessness of the network transmission mentioned above.

Moreover, since the contents conversion processing is locally conducted, if the compound contents delivery requests from a plurality of portable terminals 104 concentrate, the processing load in the converting apparatus 103 increases.

Still moreover, in a case in which the conversion requests occurs for the same delivery data, there is a need to store the contents fetched from the contents server 101 as a file every time before conducting the contents conversion processing, which further increases the processing load in the converting apparatus 103.

SUMMARY OF THE INVENTION

The present invention has been developed in consideration of the above-mentioned problems, and it is therefore an object of the invention to provide a compound contents delivery method and delivery system capable of reducing the network transmission quantity and of distributing the system processing load.

For this purpose, in accordance with an aspect of the present invention, there is provided a compound contents delivery method using a plurality of contents servers to which a plurality of contents are distributed to be stored in their contents storage units, respectively, a management server for managing the delivery of contents to a portable terminal and an intermediate apparatus for mediating the supply of contents from the plurality of contents servers to the management server so that the plurality of contents distributed to the plurality of contents servers are partially fetched as contents portions to combine the fetched contents portions according to time series for delivering compound contents produced through the combination thereof to the portable terminal, the method comprising an instruction information production step of, in the management server, producing instruction information for the production of the compound contents on the basis of the substance of the compound contents to be produced, a contents portion fetching instruction step of, in the intermediate apparatus, instructing the contents servers to fetch the contents portions needed for the production of the compound contents according to the instruction information produced in the instruction information production step, a compound contents element acquisition step of, in each of the contents servers, acquiring the compound contents element converted in encoding format for the portable terminal in corresponding relation to the contents portion which is an object of the fetching instruction in the contents portion fetching instruction step to return it to the intermediate apparatus, a production step of, in the intermediate apparatus, combining the compound contents elements returned from the contents servers according to time series on the basis of the instruction information from the management server to produce compound contents oriented to the portable terminal, and a delivery step of, in the management server, delivering the compound contents produced in the production step to the portable terminal.

In this arrangement, preferably, the method further comprises a step of, in the management server, storing and managing the compound contents returned from the intermediate apparatus in corresponding relation to the instruction information in the past in a state associated with the instruction information, an identity decision step of making a decision as to the identity between the instruction information produced in the instruction information production step and the instruction information stored in the management server, and an in-management-server first control step of, when the decision result in the identity decision step shows the produced instruction information is identical with the instruction information stored and managed in the management server, using the compound contents stored in a state associated with the stored instruction information as the compound contents to be delivered to the portable terminal in the delivery step and, when the decision shows no identity therebetween, transmitting the produced instruction information to the intermediate apparatus.

Moreover, preferably, a plurality of intermediate apparatuses each identical with the aforesaid intermediate apparatus are provided, and in the identity decision step, a decision is made as to the degree of similarity between the produced instruction information and the instruction information stored in the management server, and in the in-management-server first control step, when the decision result in the identity decision step shows that the produced instruction information is not identical with the instruction information stored and managed in the management server, the produced instruction information is transmitted to the intermediate unit to which the compound contents information is returned with respect to, of the instruction information stored and managed in the management server, the instruction information which is decided to be most similar to the produced instruction information.

Still moreover, it is also appropriate that a plurality of intermediate apparatuses each identical with the aforesaid intermediate apparatus are provided, and in the management server, a processing load monitoring step is implemented to monitor a processing load in the converting unit and an in-management-server second control step is provided to transmit the instruction information produced in the instruction information production step to the converting unit having a smallest processing load on the basis of the monitor result from the processing load monitoring step.

Yet moreover, it is also appropriate that, in the compound contents element acquisition step, the intermediate apparatus stores and manages the compound contents elements returned from the contents server in the past, and the contents portion fetching instruction step includes an in-intermediate-unit duplication decision step of obtaining information for specifying the contents portion needed for compound contents production from the instruction information and making a decision as to the degree of duplication in substance between the contents portion needed for the compound contents production and the compound contents element stored and managed in the intermediate apparatus and a fetching instruction execution step for giving a fetching instruction to the contents server on the basis of the decision result in the in-intermediate-unit duplication decision step.

In this case, it is also appropriate that, in the fetching instruction execution step, on the basis of the decision result in the in-intermediate-unit duplication decision step, the fetching instruction is not given to the contents server with respect to a duplicate portion between the substance of the contents portion needed for the production of the compound contents and the compound contents element stored and managed, and the compound contents element corresponding to the duplicate portion is used in producing the compound contents in the production step.

Moreover, it is also appropriate that, in the fetching instruction execution step, on the basis of the decision result in the in-intermediate-unit duplication decision step, when the substance of a portion of the contents portion needed for the production of the compound contents is duplicate with respect to the compound contents element stored and managed, the fetching instruction on the contents portion nonduplicate with respect to the compound contents element is given to the contents server.

According to the present invention, it is also possible that each of the contents servers stores and manages the compound contents element returned in the compound contents element acquisition step in the past and the compound contents element acquisition step includes an in-contents-server duplication decision step of making a decision on the degree of the duplication between the contents portion which is an object of the fetching instruction in the contents portion fetching instruction step and the compound contents element stored and managed in the contents server and a compound contents element reply step of, on the basis of the decision result in the in-contents-server duplication decision step, fetching the contents portion, which is an object of the fetching instruction, from the contents storage unit and making a conversion into an encoding format for the portable terminal to return it as the compound content element to the intermediate apparatus.

In this case, it is also appropriate that, in the compound contents element reply step, on the basis of the decision result in the in-contents-server duplication decision step, of the contents portion which is an object of the fetching instruction in the contents portion fetching instruction step, a portion duplicate in substance with respect to the compound contents element stored and managed is not fetched from the contents storage unit while the compound contents element corresponding to the substance duplicate portion is returned to the intermediate apparatus.

In addition, it is also appropriate that, in the compound contents element reply step, on the basis of the decision result in the in-contents-server duplication decision step, of the contents portion which is an object of the fetching instruction in the contents portion fetching instruction step, a portion non-duplicate in substance with respect to the compound contents element stored and managed is fetched from the contents storage unit and, after a conversion is made into an encoding format for the portable terminal, the non-duplicate portion is returned as the compound contents element to the intermediate apparatus.

Still additionally, it is also possible that, in the contents server, on the basis of the popularity, important event and the like, a contents portion expected to be an object of the fetching instruction in the contents portion fetching instruction step is stored and managed as the compound contents element in advance.

Yet additionally, it is also appropriate that each of the contents distributed to the plurality of contents servers includes data having a time zone including voice data or motion picture data and the contents portion is arranged through the use of the voice or motion picture data partially extracted from the time zone.

In this case, it is also appropriate that, in the contents portion fetching instruction step of the intermediate apparatus, the contents portion for the compound contents production which is an object of the fetching instruction is designated by designating the information about a service location on the internet having the contents portion, a time zone of the contents portion, a media assortment or an encoding condition after the encoding conversion.

Furthermore, in accordance with another aspect of the present invention, there is provided a compound contents delivery system comprising a plurality of contents servers to which a plurality of contents are distributed to be stored in their contents storage units, respectively, a management server for managing the delivery of contents to a portable terminal and an intermediate apparatus for mediating the supply of contents from the plurality of contents servers to the management server so that the plurality of contents distributed to the plurality of contents servers are partially fetched as contents portions to combine the fetched contents portions according to time series for delivering compound contents produced through the combination thereof from the management server to the portable terminal, wherein the management server includes a compound contents acquisition unit for acquiring the compound contents on the basis of instruction information for the production of the compound contents which is produced on the basis of the substance of the compound contents to be produced and a delivery unit for delivering the compound contents acquired by the compound contents acquisition unit to the portable terminal, and the intermediate apparatus includes a contents portion fetching instruction unit for instructing the contents servers to fetch the contents portions needed for the production of the compound contents when receiving a request for the production of the compound contents and the instruction information from the compound contents acquisition unit, a production unit for combining the compound contents elements returned from the contents servers according to time series on the basis of the instruction information from the management server to produce compound contents oriented to the portable terminal, a compound contents outputting unit for outputting the compound contents produced in the production unit to the compound contents acquisition unit of the management server, and each of the contents servers includes a compound contents element acquisition unit for acquiring the compound contents element, in which an encoding format is converted for the portable terminal, corresponding to the content portion which is an object of the fetching instruction in the contents portion fetching instruction unit to return it to the intermediate apparatus.

In this case, it is also appropriate that the management server includes an in-management-server storage management unit for storing and managing the compound contents returned from the intermediate apparatus in corresponding relation to the instruction information in a state where the compound contents are associated with the instruction information.

Moreover, it is also appropriate that the intermediate apparatus includes an in-intermediate-apparatus storage management unit for storing and managing the compound contents element returned from the contents server through the use of the compound contents element acquisition unit.

Still moreover, it is also appropriate that each of the contents servers includes a storage management unit for storing and managing the compound content element from the compound contents element acquisition unit.

As described above, according to the present invention, since the compound contents element acquisition unit of each of the contents servers acquires the compound contents element, converted in encoding format for the portable terminal, in corresponding relation to the contents portion which is an object of the fetching instruction in the contents portion fetching instruction step to return it to the intermediate apparatus, as compared with the conventional example in which the segment conversion processing is conducted in the intermediate apparatus, the transmission quantity in the network is reducible, and as compared with the conventional system, the concentration of the processing load in the intermediate apparatus is preventable, the distribution of the processing load is feasible, and the stable offer of the compound contents delivery service is possible.

In addition, for the storage and management in each of the contents servers, the management server and the intermediate apparatus, the compound contents elements are stored and managed so that the already converted segment is re-usable, thus eliminating the need for conducting the conversion processing on the redundant encoding format in each apparatus, which provides the advantages of the network transmission quantity being reducible and the system processing load is reducible to shorten the compound contents production processing time.

BRIEF DESCRIPTION OF THE DRAWINGS

FIGS. 2 and 3 are illustrations useful for explaining instruction information for the production of compound contents which is produced through the use of SMIL in this embodiment;

FIG. 7 is an illustration of a contents management table in the converting apparatus according to this embodiment;

FIGS. 8 and 9 are examples of the substance to be written in the management tables according to this embodiment;

FIGS. 14 to 17 are illustrations useful for explaining the processing in a converting apparatus in this embodiment;

FIG. 21 is an illustration of a contents management table according to the modification of this embodiment.

DESCRIPTION OF THE PREFERRED EMBODIMENTS

Embodiments of the present invention will be described hereinbelow with reference to the drawings.

[a] Description of Embodiment of the Present Invention

Figure 1:
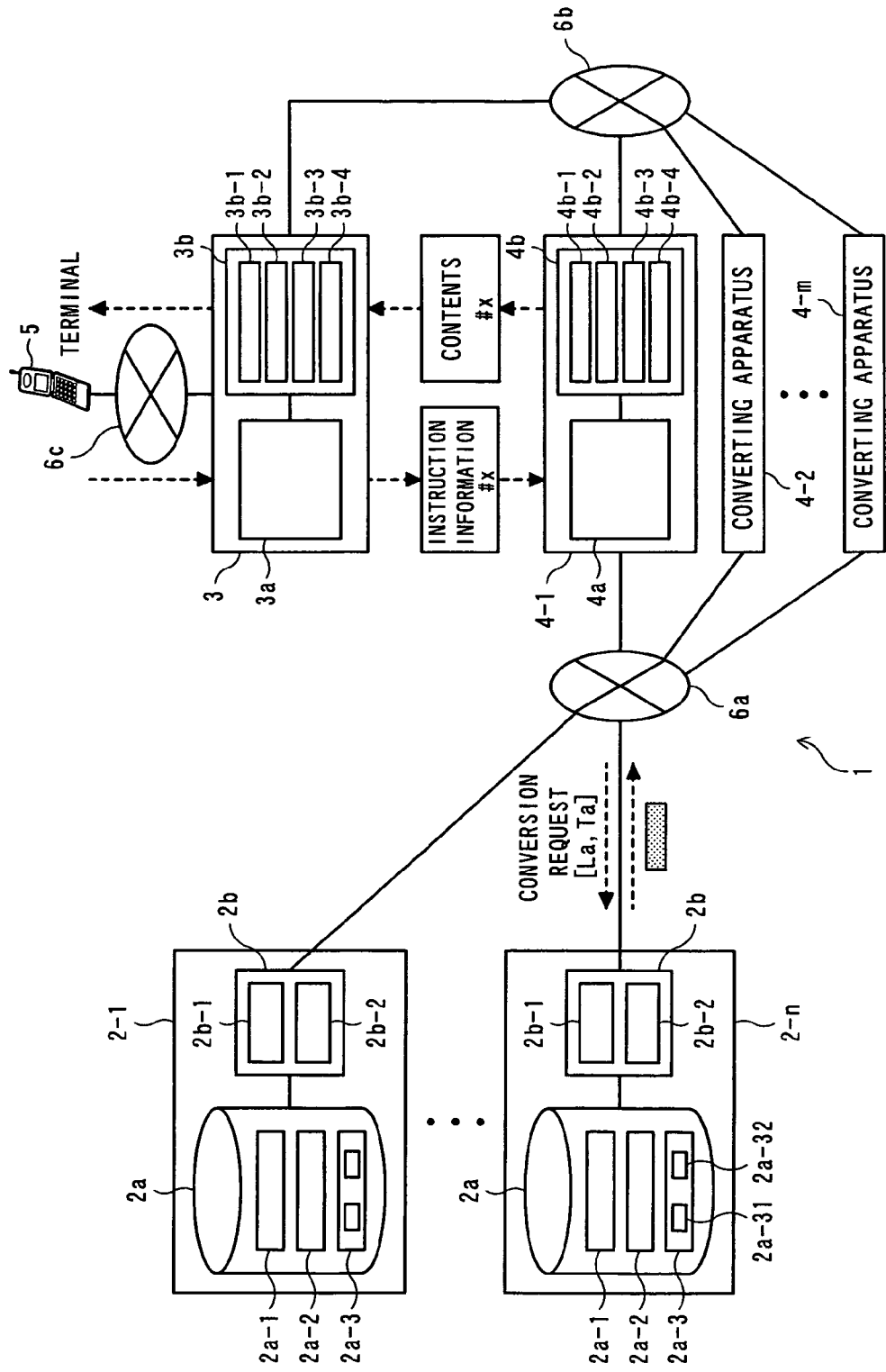
FIG. 1 is an illustration of a compound contents delivery system according to an embodiment of the present invention.

FIG. 1 is an illustration of a compound contents delivery system according to an embodiment of the present invention. In FIG. 1, a compound contents delivery system, generally designated at reference numeral 1, is made up of a plurality of contents servers 2-1 to 2-n, a management server 3 and a plurality of converting apparatuses 4-1 to 4-m.

In this configuration, the management server 3 is connected through a network 6c to a portable terminal 5 for managing the delivery of contents to the portable terminal 5, and the contents servers 2-1 to 2-n are for storing a plurality of contents in a state distributed.

The converting apparatuses 4-1 to 4-m are connected through a network 6a to the contents servers 2-1 to 2-n and are connected through a network 6b to the management server 3, with they being constructed as an intermediate apparatus which mediates the supply of the contents from the plurality of contents servers 2-1 to 2-n to the management server 3.

That is, upon receipt of a request for the production of compound contents from the management server 3, the converting apparatuses 4-1 to 4-m collect contents data (compound contents elements or segments) for the compound contents production from the contents servers 2-1 to 2-n on the basis of instruction information for the compound contents production and convert the collected segments into compound contents data and return (reply) it to the management server 3.

Moreover, the management server 3 is equipped with a storage unit 3a including a memory, a hard disk or the like, and a processing unit 3b made to conduct execution processing on a program loaded in the memory constituting the storage unit 3a. Still moreover, the processing unit 3b is made to realize an instruction information production unit 3b-1, a compound contents acquisition unit 3b-2, a delivery unit 3b-3 and a storage management unit 3b-4, which will be mentioned later, through the program execution processing.

In this configuration, the instruction information production unit 3b-1 is for producing instruction information for the compound contents production on the basis of the substance of compound contents to be produced. Concretely, it produces the instruction information, for example, through the use of SMIL shown in FIG. 2 on the basis of, for example, contents title selection by the portable terminal 5, event driven, terminal ability, user's liking and the like. The SMIL describes a time series combination of contents with the XML (extensible Markup Language), and expresses the synchronization among contents through the use of the nesting structure of the XML.

FIG. 3 shows, with respect to the instruction information shown in FIG. 2 as one example, the URLs (Uniform Resource Locators) of contents portions forming components of the compound contents, media assortments to be fetched and extraction time periods according to a reference time sequence (segment IDs). In this case, the "contents portion" signifies contents to be incorporated as a component of compound contents into the compound contents according to time series, and is a portion extracted from a time zone forming an object of reference.

In FIG. 3, the media assortment of the contents marked with the segment ID "1" is WMV (video file of Windows\Media(R)), the media assortment of the contents of the segment ID "2" is WMA (audio file of Windows\Media(R)), the media assortment of the contents of the segment ID "3" is MPEG (Moving Picture Experts Group)-4video, and the media assortment of the contents of the segment ID "4" is MPEG-1 audio.

In addition, the instruction information shown in FIG. 3 gives an instruction for the production of compound contents in which the contents of the segment ID "1" is referred to for 10 seconds from the regeneration position after the elapse of 5 seconds from the start point thereof and the contents of the segment ID "2" is then referred to for 10 seconds from the regeneration position after the elapse of 10 seconds from the start point thereof, and the contents of the segment IDs "3" and "4" are consecutively referred to for designated times from the regeneration positions at the times designated with respect to the start points, respectively.

Incidentally, it is also acceptable that the function of the aforesaid instruction information production unit 3b-1 is not placed in the management server 3 but, for example, it is provided in the portable terminal 5 side so that the management server 3 receives the instruction information from the portable terminal 5.

The compound contents acquisition unit 3b-2 acquires the compound contents on the basis of the compound contents production instruction information produced in the instruction information production unit 3b-1. Concretely, when the compound contents corresponding to the instruction information produced in the instruction information production unit 3b-1 is already stored in the storage unit 3a, the compound contents are acquired from the storage unit 3a. On the other hand, if the compound contents are not stored in the storage unit 3a, the aforesaid instruction information is transmitted as a conversion request to one of the converting apparatuses 4-1 to 4-m, thereby acquiring the compound contents returned from the converting apparatus 4-1 to 4-m.

The delivery unit 3b-3 delivers the compound contents acquired by the compound contents acquisition unit 3b-2 to the portable terminal 5. The storage management unit (in-management-server storage management unit) 3b-4, as will be mentioned later, writes the compound contents returned from each of the converting apparatuses 4-1 to 4-m in corresponding relation to the instruction information produced in the instruction information production unit 3b-1 in a state associated with the instruction information for the retrieval in the compound contents acquisition unit 3b-2 which will be mentioned later.

Figure 4:
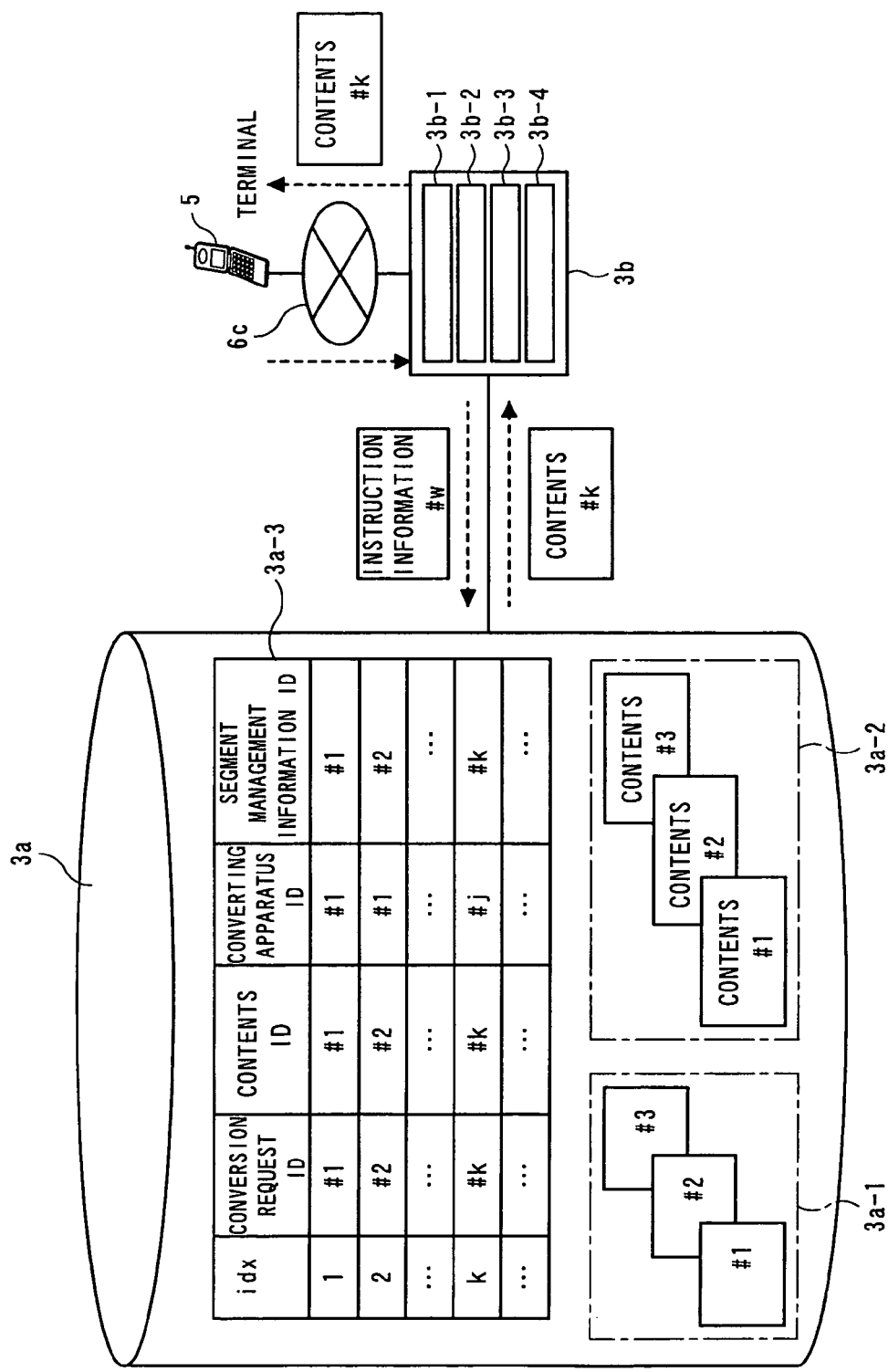
FIG. 4 is an illustration useful for explaining the substance of the storage and management in a storage management unit of a management server according to this embodiment.

FIG. 4 is an illustration useful for explaining the substance to be stored and managed in the storage management unit 3b-4 of the management server 3. The storage management unit 3b-4 writes management data of a set of segments constituting the compound contents, returned from each of the converting apparatuses 4-1 to 4-m, in a segment management table 3a-1 serving as a management data storage unit in the storage unit 3a shown in FIG. 4 and further writes compound contents data, returned from each of the converting apparatuses 4-1 to 4-m, in the contents storage unit 3a-2 acting as a cache.

In this case, when the aforesaid compound contents are multimedia contents, the management data to be written in the segment management table 3a-1 can include at least an URL on the segment information forming a set of compound contents elements, the media assortment and the extraction time period.

Moreover, in the storage management unit 3b-4, the information for the association between the segment management data stored in the segment management table 3a-1 and the contents data stored in the contents storage unit 3a-2 is written in a contents management table 3a-3.

In the segment management table 3a-1, as the aforesaid management data, a plurality of (#1 to #3) newer data returned from the converting apparatuses 4-1 to 4-m are stored in a state marked with IDs (segment management information).

In like manner, in the contents storage unit 3a-2, a plurality of (#1 to #3 in FIG. 4) latest compound contents data returned from the converting apparatuses 4-1 to 4-m are stored in a state marked with IDs (contents IDs).

Moreover, in the contents management table 3a-3, as shown in FIG. 4, an identifier (ID) allocated (attached) to a conversion request to the converting apparatuses 4-1 to 4-m, a file name (contents ID) of the contents stored in the contents storage unit 3a-2, an ID allocated to the converting apparatus receiving a conversion request and an ID (segment management information ID) of management data, an importance of a contents production request, the number of times of request and others can be stored as the aforesaid association information.

Accordingly, when the instruction information is produced in the instruction information production unit 3b-1, in the aforesaid compound contents acquisition unit 3b-2, the retrieval on the segment management table 3a-1 is made on the basis of the produced instruction information serving as a key to check whether or not the compound contents corresponding to this instruction information is stored in the storage unit 3a as the contents received from the converting apparatuses 4-1 to 4-m in the past.

Moreover, each of the converting apparatuses 4-1 to 4-m is also equipped with a storage unit 4a including a memory, a hard disk or the like and a processing unit 4b made to conduct the execution processing on a program loaded in the memory constituting the storage unit 4a. Still moreover, the processing unit 4b is designed to realize the functions of a contents portion fetching instruction unit 4b-1, a production unit 4b-2, a compound contents outputting unit 4b-3 and a storage management unit 4b-4, which will be mentioned later, through the use of the execution processing on the program.

The contents portion fetching instruction unit 4b-1, when receiving a compound contents production request (conversion request) and the instruction information from the compound contents acquisition unit 3b-2, issues a fetching instruction on a contents portion needed for the compound contents production to the contents servers 2-1 to 2-n.

That is, the compound contents acquisition unit 3b-2 transmits the instruction information produced in the instruction information production unit 3b-1 to the converting apparatus 4, while the contents portion fetching instruction unit 4b-1 of the converting apparatus 4 designates, according to the instruction information received, a file name of the contents being an object of conversion, the cutin/cutout time (extraction start time ts and extraction end time te) for the extraction, a media assortment being an object of conversion and an encoding condition after conversion and makes a request for the production of contents portions organizing the compound contents.

Moreover, the production unit 4b-2 combines segments serving as compound contents elements returned from the contents servers 2-1 to 2-n according to time series on the basis of the instruction information from the management server 3 to produce compound contents oriented to a portable terminal. The compound contents outputting unit 4b-3 outputs the compound contents produced in the production unit 4b-2 to the compound contents acquisition unit 3b-2 of the management server 3.

Still moreover, the storage management unit (in-intermediate-unit storage management unit) 4b-4, as will be mentioned later, stores and manages the segments serving as the compound contents elements, returned from the compound contents element acquisition unit 2b-1 provided in each of the contents servers 2-1 to 2-n, in the storage 4a for the retrieval in the contents portion fetching instruction unit 4b-1.

Figures 5, 6:
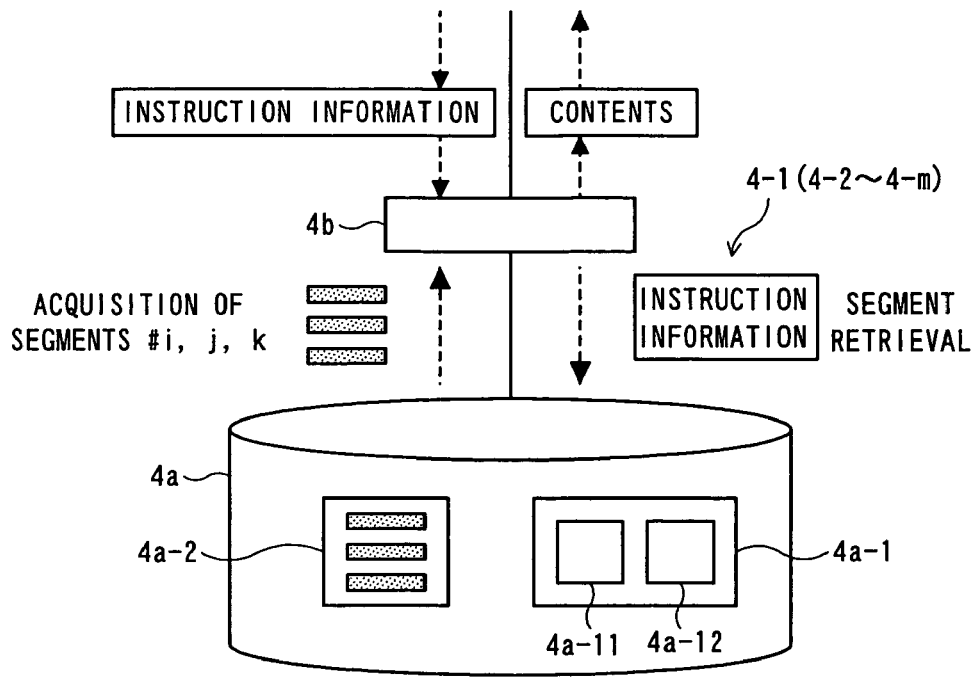
FIG. 5 is an illustration of the substance to be written in a storage unit of a storage management unit of a converting apparatus according to this embodiment.
FIG. 6 is an illustration of a contents management table in the converting apparatus according to this embodiment.

FIG. 5 is an illustration of the substance to be written in the storage unit 4a of the storage management unit 4b-4 of the converting apparatus 4-1 (4-2 to 4-m). Although FIG. 5 shows the configuration of the storage unit 4a of only the converting apparatus 4-1, the other converting apparatuses 4-2 to 4-m are constructed as in the case of the converting apparatus 4-1.

As FIG. 5 shows, the storage management unit 4b-4 of the converting apparatus 4-1 writes the management data on the segment serving as a compound contents element returned from each of the contents servers 2-1 to 2-n in the management table 4*a*-1 of the storage unit 4*a* and writes the segment data returned from each of the contents servers 2-1 to 2-*n* in the segment data storage unit 4*a*-2 acting as a cache.

Moreover, the management table 4*a*-1 of the storage unit 4*a* stores the management data on the segment corresponding to the contents portion according to URL specifying the contents and media assortment and, for examples, it is composed of a contents management table 4*a*-11 shown in FIG. 6 and a segment management table 4*a*-12 shown in FIG. 7.

The contents management table 4*a*-11, with respect to the management data on the segment returned from each of the contents servers 2-1 to 2-*n*, manages common data for each contents and, for example, as shown in FIG. 6, stores IDs of the contents servers 2-1 to 2-*n* storing this contents, URLs specifying the contents, media assortments and segment management table IDs for the link with the segment management table 4*a*-12.

The segment management table 4*a*-12 stores the management data on objects stored as the segment of this contents in the segment data storage unit 4*a*-2 in a state associated with the substance stored in the contents management table 4*a*-11 through the segment management table IDs. For example, as shown in FIG. 7, it stores, as the management data, the extraction time period (cutin & cutout) on each segment, an encoding format and others in a state where a segment ID is allocated thereto. The "cutin" represents the extraction start time and the "cutout" denotes the extraction end time.

Incidentally, in FIG. 7, although the extraction time period is expressed with [$\alpha$, $\beta$], this signifies that the reference starts with the time point after the elapse of $\alpha$ seconds from the start point of a contents file specified by the object URL and the media assortment being set as the extraction start time and the reference comes to an end with the time point after the elapse of $\beta$ seconds from the start point being set as the extraction end time.

Moreover, in the segment data storage unit 4*a*-2, each of the segment data corresponding to the management data stored in the aforesaid management table 4*a*-1 is stored in a state where the corresponding ID (segment ID) is allocated thereto.

That is, in the aforesaid contents portion fetching unit 4*b*-1, in making an instruction on the contents portion fetching to the contents servers 2-1 to 2-*n*, the retrieval on the management table 4*a*-1 of the storage unit 4*a* is made to find, of the contents portions needed for the compound contents production, a portion stored in the storage unit 4*a* in a duplicate condition. This can make an instruction on the fetching to the contents servers 2-1 to 2-*n* by designating the contents portions except the portion stored in the storage unit 4*a*.

Still moreover, each of the contents servers 2-1 to 2-*n* is equipped with a storage unit 2*a* including a large-capacity hard disk acting as a contents storage unit for storing a plurality of contents in a state distributed and a memory for the execution processing on a program, and it is further equipped with a processing unit 2*b* for conducting the execution processing on the program. The processing unit 2*b* is made to realize the functions of a compound contents element acquisition unit 2*b*-1 and a storage management unit 2*b*-2, which will be mentioned later, through the program execution processing.

That is, the compound contents element acquisition unit 2*b*-1 acquires a segment serving as a compound contents element undergoing the conversion into an encoding format for the portable terminal in corresponding relation to the contents portion which is an object of the fetching instruction (which is to be fetched according to the instruction) in the contents portion fetching instruction unit 4*b*-1 to return it to the converting apparatuses 4-1 to 4-*m*.

The storage management unit 2*b*-2 stores and manages the segment serving as the compound contents element after the encoding conversion in the compound contents element acquisition unit 2*b*-1 for the retrieval in the compound contents element acquisition unit 2*b*-1 which will be mentioned later.

The storage unit 2*a* is equipped with a contents storage unit 2*a*-1 for storing a plurality of contents in a state distributed, a segment storage unit 2*a*-2 serving as a cache for storing a segment serving as a compound contents element after the encoding conversion in the compound contents element acquisition unit 2*b*-1 for the retrieval in the compound contents element acquisition unit 2*b*-1, and a management table 2*a*-3 for storing the management data on the segment stored in the segment storage unit 2*a*-2.

That is, the storage management unit 2*b*-2 writes the segment serving as the compound contents element after the encoding conversion in the compound contents element acquisition unit 2*b*-1 in the segment data storage unit 2*a*-2 and writes the management data on the segment written in the segment data storage unit 2*a*-2 in the management table 2*a*-3.

Figure 9:
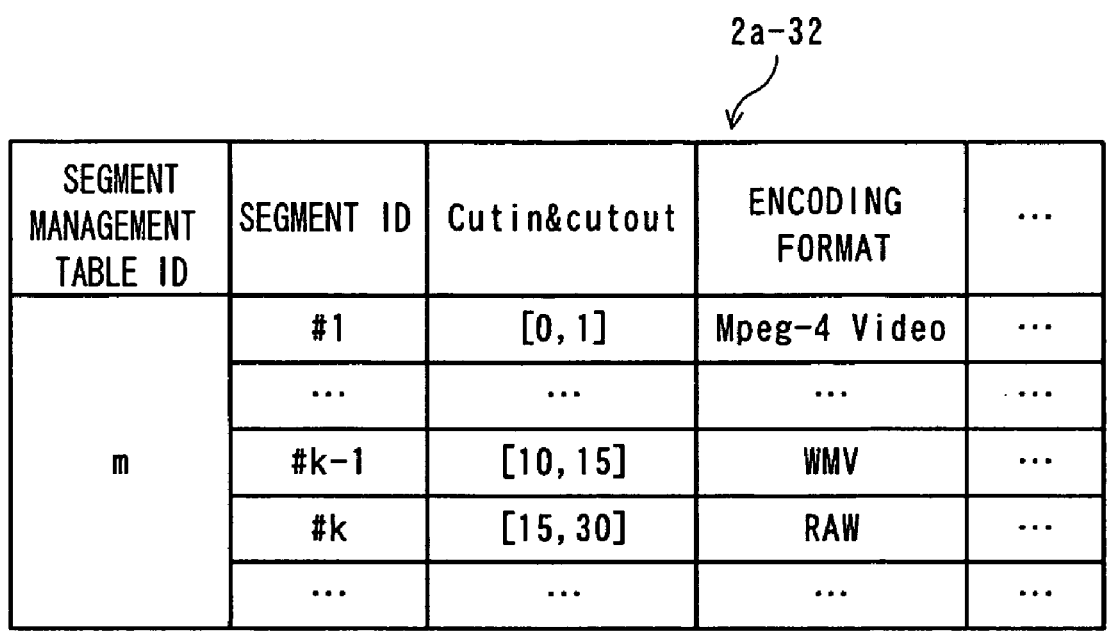

FIGS. 8 and 9 are illustrations of one example of substance to be written in the management table 2*a*-3. That is, the management table 2*a*-3 is for storing the management data on the segment undergoing the encoding conversion in the compound contents element acquisition unit 2*b*-1 for each URL specifying the contents and each media assortment and, for example, it is composed of a contents management table 2*a*-31 shown in FIG. 8 and a segment management table 2*a*-32 shown in FIG. 9.

The contents management table 2*a*-31 is for, with respect to the management data on the segment undergoing the encoding conversion in the compound contents element acquisition unit 2*b*-1, managing common data for each contents. For example, as shown in FIG. 8, it stores IDs allocated to the contents, URLs for specifying the contents, media assortments and segment management table IDs for the link with the segment management table 2*a*-32.

The segment management table 2*a*-32 is for storing management data on data stored as the segment of the contents in the segment data storage unit 4*a*-2 in a state associated with the substance stored in the contents management table 2*a*-31 through the segment management table ID. For example, as shown in FIG. 9, it stores, as the management data, the extraction time period (cutin&cutout) on each of the segments, the encoding formats and others in a state where segment IDs are allocated thereto.

In the segment data storage unit 2*a*-2, the segment data corresponding to the management data stored in the aforesaid management table 2*a*-3 are stored in a state where the corresponding IDs (segment IDs) are allocated thereto.

That is, in the aforesaid compound contents element acquisition unit 2*b*-1, when the contents portions each of which is an object of the fetching instruction is fetched from the storage unit 2*a*, the retrieval on the management table 2*a*-3 of the storage unit 2*a* is made to find, of the contents portions to be fetched through the instruction, the corresponding segment after the encoding format is already converted.

Accordingly, in the compound contents element acquisition unit 2*b*-1, of the contents portions fetched according to the instruction, the portion stored as a segment in the segment data storage unit 2*a*-2 is fetched from the segment data storage unit 2*a*-2 and the contents portions except the portion stored in the segment data storage unit 2*a*-2 are fetched from the contents storage unit 2*a*-1 and, after the conversion of the encoding format for the regeneration in the portable terminal, they are used as segment information to be returned to the converting apparatuses 4-1 to 4-m.

That is, in the compound contents element acquisition unit 2b-1, as the segment information to be returned to the converting apparatuses 4-1 to 4-m, the already encoding-converted portion is fetched from the storage unit 2a, thereby enhancing the efficiency of the processing in the compound contents element acquisition unit 2b-1.

In this connection, the encoding format conversion in the aforesaid compound contents element acquisition unit 2b-1 is included as an encoding condition in the instruction information from the converting apparatuses 4-1 to 4-m. Moreover, this encoding conversion processing includes the processing of converting the media assortment of the contents stored in the storage unit 2a in corresponding relation to the instruction on the media assortment of the contents portion included in the instruction information produced in the instruction information production unit 3b-1 of the management server 3 and the processing of converting the data rate of the data (for example, in the case of image data, image size, resolution and others) on the contents stored in the storage unit 2a into a data rate regenerable in the portable terminal 5.

Figure 10:
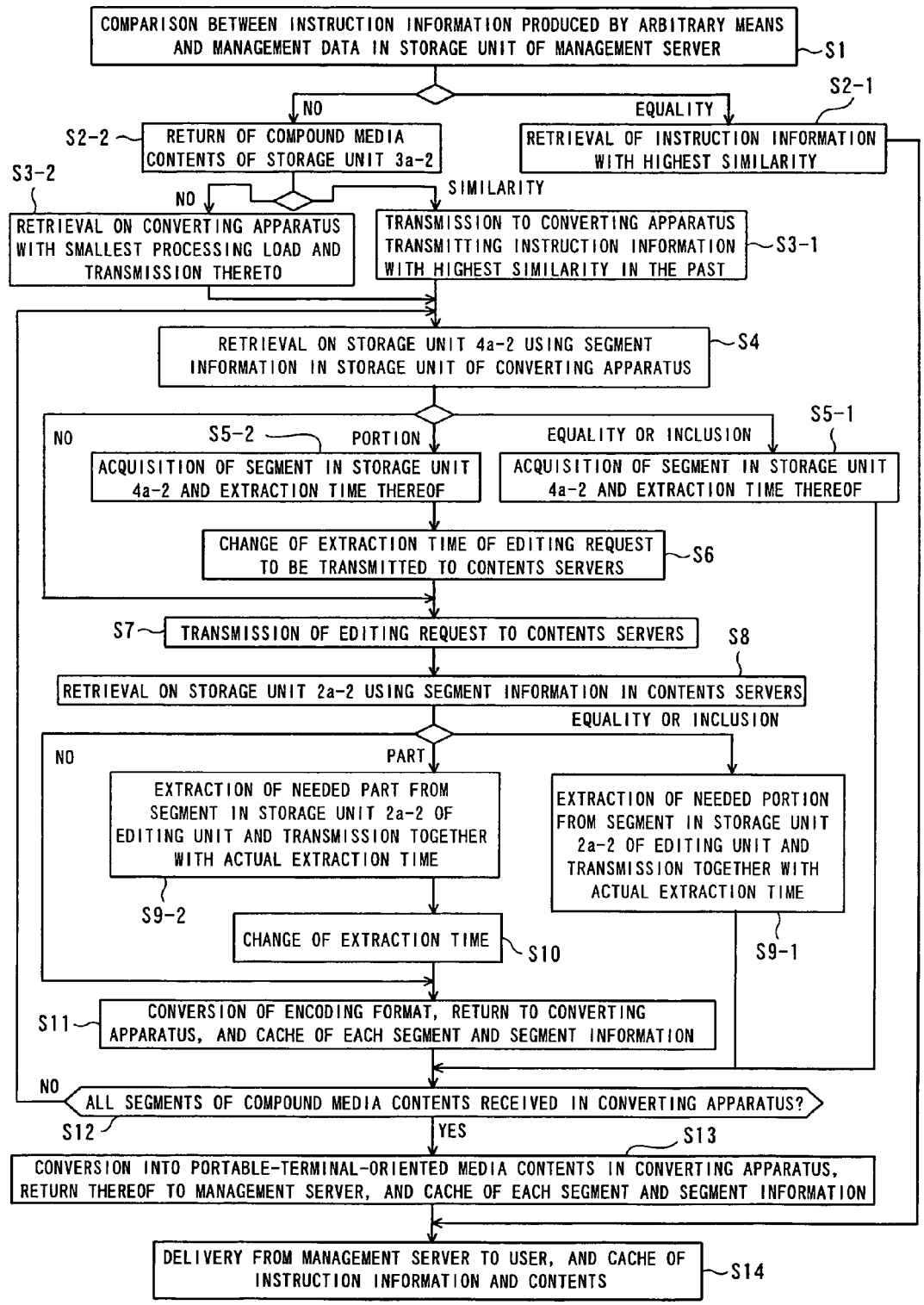
FIG. 10 is a flow chart useful for explaining a compound contents delivery mode according to an embodiment of the present invention.

Secondly, referring to a flow chart of FIG. 10, a description will be given hereinbelow of a compound contents delivery mode according to an embodiment of the present invention.

First of all, in the instruction information production unit 3b-1 of the management server 3, instruction information for the compound contents production is produced on the basis of the substance of the compound contents to be produced, which is determined on the basis of, for example, contents title selection by the portable terminal 5, event driven, terminal ability, user's liking and the like (instruction information production step). The compound contents acquisition unit 3b-2 starts the processing of acquiring the compound contents on the basis of the produced instruction information.

The compound contents acquisition unit 3b-2 makes a decision the identity between the instruction information produced in the instruction information production unit 3b-1 and the management data corresponding to the instruction information stored in the storage unit 3a of the management server 3 (identity decision step, step S1). In this case, the "identity decision" includes a decision on whether or not the instruction information is completely equal to the management data and a decision on the degree of similarity between the instruction information and the management data.

In a case in which the decision result in the identity decision step shows that the produced instruction information is identical to the instruction information stored and managed in the management server 3, the compound contents stored in a state associated with the stored instruction information are used as the compound contents to be delivered to the portable terminal (through the "equality" route of step S1 to step S2-1). On the other hand, in the case of no equality, the instruction information produced in the instruction information production unit 3b-1 is transmitted to one of the intermediate apparatuses 4-1 to 4-m (in-management-server (first) control step, "NO" route of step S1).

Figure 11:
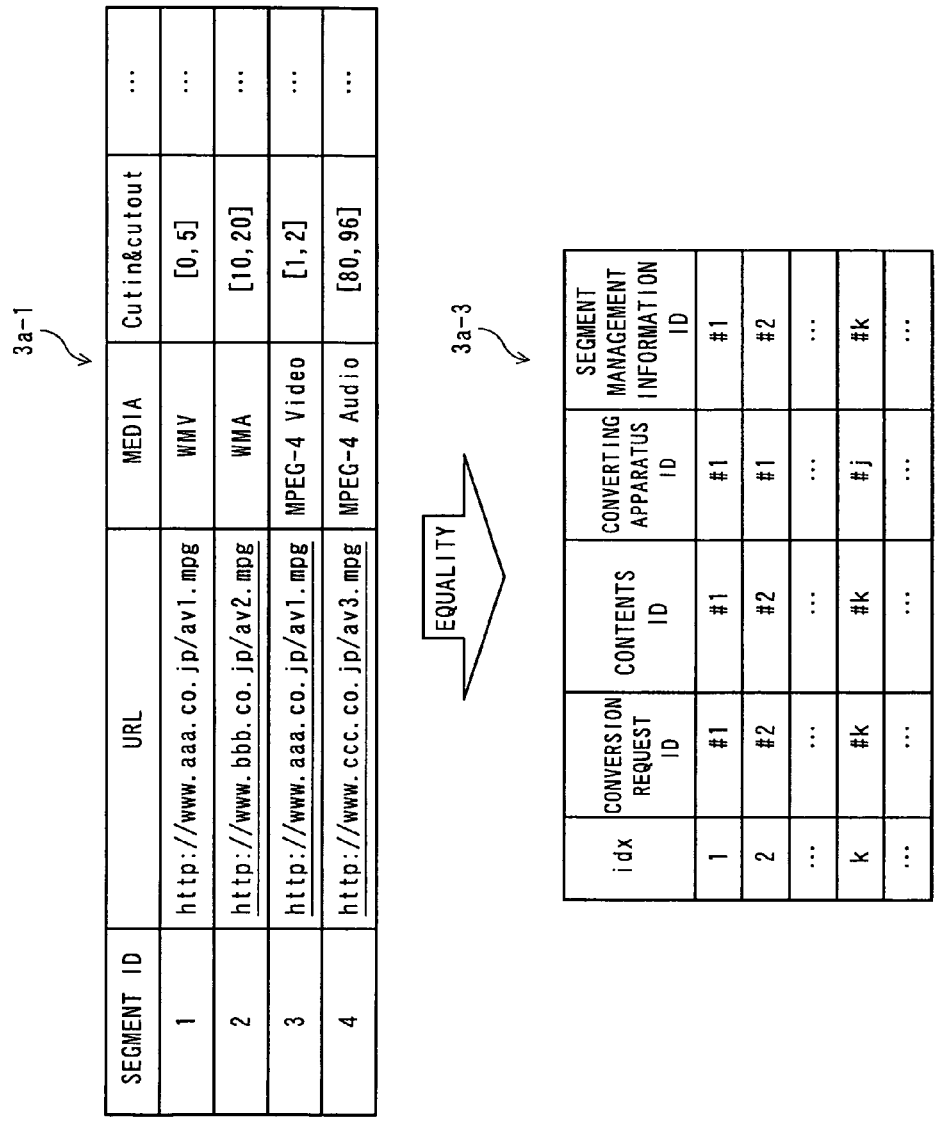
FIGS. 11 to 13 are illustrations useful for explaining the processing in a management server in this embodiment.

That is, as shown in FIG. 11, in the compound contents acquisition unit 3b-2, when the result of the retrieval on the segment management table 3a-1 indicates that the management data including at least the URL, the media assortment and the extraction time period is fully identical to the instruction information serving as a retrieval key, the contents management table 3a-3 is then referred to with the segment management information ID allocated to that management data being used as a key to acquire the content ID associated with that management data. Moreover, by making reference to the contents storage unit 3a-2 through the use of this content ID, the target compound contents data is obtainable.

Therefore, when the data on the compound contents acquired in the past is stored in the storage unit 3a of the management server 3, the conversion request (transmission of instruction information) to the converting apparatuses 4-1 to 4-m for acquiring the compound contents data is omissible, which leads to reducing the processing load in the converting apparatuses 4-1 to 4-m and the contents servers 2-1 to 2-n.

In the compound contents acquisition unit 3b-2, when the data on the compound contents (for example, compound media contents) is acquired from the contents storage unit 3a-2 (step S2-1), through the use of the delivery unit 3b-3 of the management server 3, the acquired compound media contents are delivered to the relevant portable terminal 5 and the substances of the aforesaid segment management table 3a-1, contents storage unit 3a-2 and contents management table 3a-3 are updated (step S13).

Moreover, in the compound contents acquisition unit 3b-2, also in a case in which the result of the retrieval on the segment management table 3a-1 shows that there is no management data identical to the instruction information serving as a retrieval key, a request for the contents production can be issued to the converting apparatus 4-1 to 4-m which has returned the compound contents most similar in substance to this instruction information.

Figure 12:
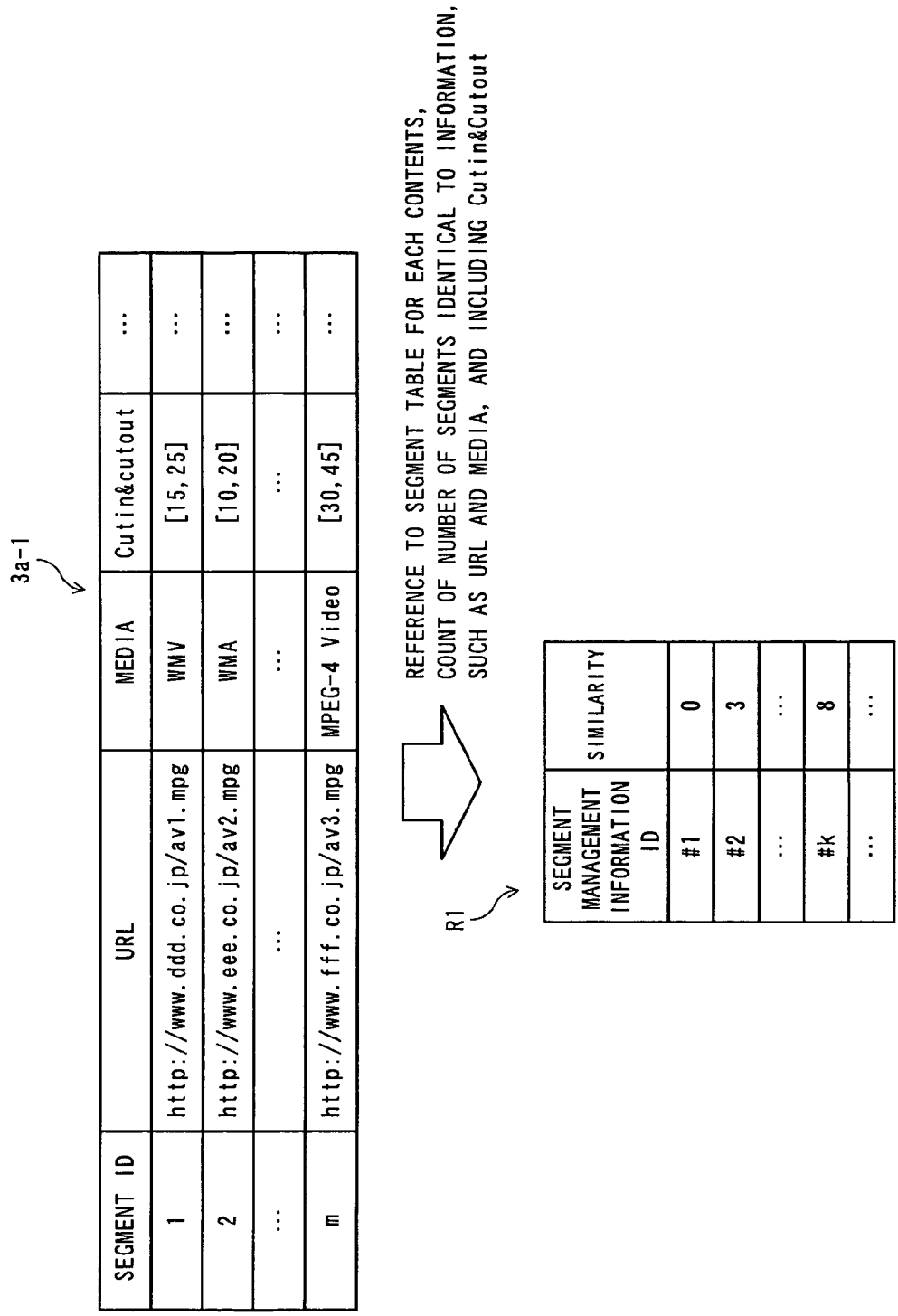

That is, as shown in FIG. 12, in the compound contents acquisition unit 3b-2, in the process of the retrieval on the segment management table 3a-1, a decision is made as to the degree of similarity between the instruction information produced in the instruction information production unit 3b-1 and the instruction information stored in the segment management table 3a-1 (step S2-2).

Concretely, in the compound contents acquisition unit 3b-2, the segment management table 3a-1 of the storage unit 3a is referred to count the elements identical in management data elements, such as the URL, the media assortment and the encoding data format after the conversion, and including the entire cutin&cutout time period or a portion thereof at every management data of the segment information in a file stored in the contents storage unit 3a-2 of the management server 3.

The compound contents acquisition unit 3b-2 counts the management data on all the segments by making reference to the segment management table 3a-1 as indicated by R1 in FIG. 12. The resultant count value is used as an index value for making a decision on the similarity.

That is, in the compound contents acquisition unit 3b-2, according to the element count result, the segment management data having the largest count value is decided to be the segment management data decided as having the highest similarity to the instruction information, thereby obtaining the segment management information ID of this segment management data.

Subsequently, the ID number of the converting apparatus associated with the management data is obtained by referring to the contents management table 3a-3 with the segment management information ID attached to that management data being used as a key. Therefore, in the compound contents acquisition unit 3b-2, a request for the contents production can be made to the converting apparatus 4-1 to 4-m which returns, of the compound contents data stored in the storage unit 3a, the compound contents most similar to the instruction information.

Accordingly, in the contents data acquisition unit 3b-2, in a case in which, in the instruction information stored and managed in the management server 3, there is no instruction information identical to the produced instruction information, the produced instruction information is transmitted to the intermediate apparatus 4-1 to **4-*m* which has returned, of the instruction information stored and managed in the management server 3**, the compound contents information related to the instruction information which has been decided as being most similar to the produced instruction information (step S3-1).

Moreover, in the compound contents acquisition unit **3*b*-2, in a case in which the aforesaid count values of all the management data stored in the segment management table 3*a*-1 are "0", the processing load information on the converting apparatuses 4-1 to 4-*m*** can be acquired to make a request for the conversion to the converting apparatus having the smallest processing load.

That is, the contents data acquisition unit **3*b*-2 of the management server 3 acquires the converting apparatus processing load information through a network 6*b* to monitor the processing load of each of the converting apparatuses 4-1 to 4-*m* (processing load monitoring step) and transmits, on the basis of the monitor result, the instruction information produced in the instruction information production unit 3*b*-1 to the converting apparatus 4-1 to 4-*m*** having the smallest processing load (step S3-2, in-management-server second control step).

Moreover, the converting apparatus 4-1 to **4-*m* which has received a compound contents production request together with the instruction information from the management server 3 makes an instruction on the fetching of the contents portion needed for the compound contents production to the contents servers 2-1 to 2-*n*** according to the instruction information (contents portion fetching instruction step, steps S4 to S12).

Concretely, in making the instruction on the fetching of the needed contents portions to the contents servers 2-1 to **2-*n*, the contents portion fetching instruction unit 4*b*-1 of the converting apparatus 4-1 to 4-*m* which received the instruction information from the management server 3 first retrieves the substance written in the storage unit 4*a* by the storage management unit 4*b*-4, which will be mentioned later, to find the segment identical to the contents portion of the instruction information from the management server 3** or including a portion thereof.

Therefore, in the contents portion fetching instruction unit **4*b*-1 of the aforesaid converting apparatus 4-1 (or 4-2 to 4-*m*), when a request for the contents production is made from the management server 3, the retrieval is first made on the substances of the segment management table 4*a*-1 and the segment data storage unit 4*a*-2 written through the above-mentioned writing processing by the storage and management unit 4*b*-4** with the instruction information indicative of the contents production request substance being used as a key (step S4).

Accordingly, in the contents portion fetching instruction unit **4*b*-1 of each of the converting apparatuses 4-1 to 4-*m*, in outputting a contents portion fetching instruction to the contents servers 2-1 to 2-*n*, the information for specifying the contents needed for the compound contents production is acquired from the aforesaid instruction information, and a decision is made on the degree of duplication (repetition) in substance between the contents portions needed for the compound contents production and the compound contents elements stored and managed in the converting apparatus 4-1 to 4-*m*** it pertains to (in-intermediate-apparatus duplication decision step).

Moreover, the contents portion fetching instruction unit **4*b*-1 issues a fetching instruction to the contents servers 2-1 to 2-*n*** on the basis of the decision result (fetching instruction execution steps S5-1, S5-2, S6 and S7).

That is, the retrieval is made as to whether or not, in the segment management table **4*a*-1**, there is the management data including the same URL and media assortment as those of the aforesaid instruction information and including the entire cutin&cutout time period or a portion thereof.

Moreover, if the retrieval result shows no acquisition of the segment in which the substance of the instruction information exists as the management data in the segment management table **4*a*-1, the instruction information received from the management server 3 is transmitted to the contents servers 2-1 to 2-*n* and the request for the fetching of the compound contents element is made to the contents servers 2-1 to 2-*n*** (through "NO" route of step S4 to step S7).

On the other hand, if the retrieval result shows no acquisition of the segment in which all the substances of the instruction information exist as the management data in the segment management table **4*a*-1, the reference to the segment ID is made to acquire the segment, extracted for the cutin&cutout time period in corresponding relation to this segment ID, from the segment data storage unit 4*a*-2 (through "equality or inclusion" route of step S4 to step S5-1). At this time, the converting apparatuses 4-1 to 4-*m* do not transmit the conversion request for this segment to the contents servers 2-1 to 2-*n***.

Moreover, in the contents portion fetching instruction unit **4*b*-1, when the result of the retrieval on the segment management table 4*a*-1 indicates the acquisition of the segment having the same URL and media assortment as those designated by the instruction information and including a portion of the contents extraction time period cutin&cutout [ts, te], the portion of the segments are obtained from the segment data storage unit 4*a*-2 (through "portion" route of step S4 to step S5-2) and the instruction information is rewritten to output the fetching instruction (conversion request) on the segment for the remaining extraction time period to the contents servers 2-1 to 2-*n*** (step S6).

Figure 13:
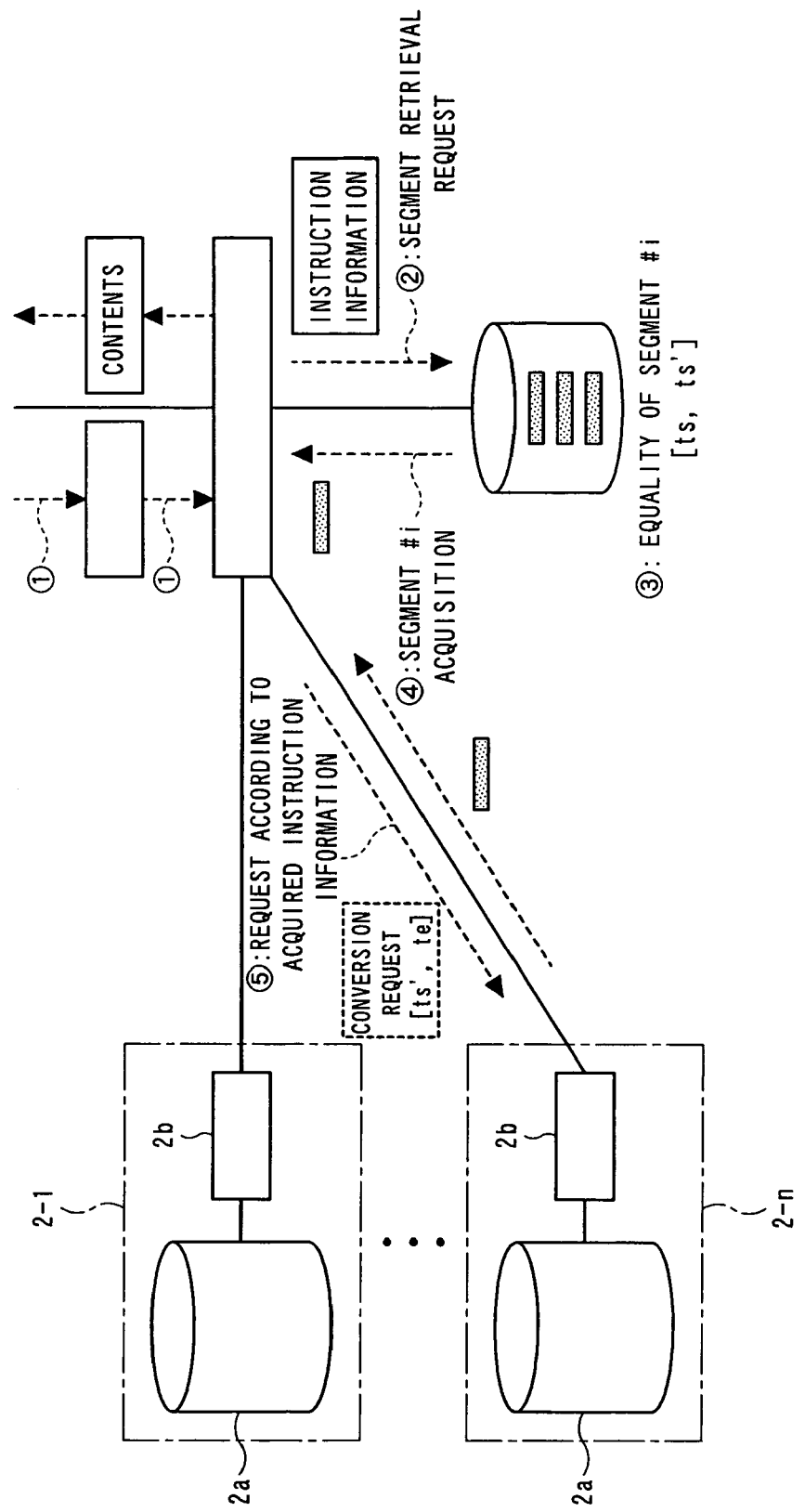

For example, as shown in FIG. 13, let it be assumed that a segment including cutin&cutout time period [tsl', tel'] (tsl'<ts, tel'<te) is found (see circled numerals 2 and 3) in the converting apparatus 4-1 which has received the instruction information (see circled numeral 1). In this case, in the step S5-2, the segment ID of the segment management table **4*a*-1 is referred to for acquiring the cutin&cutout time period [tsl', tel'] of that segment and a segment corresponding to a portion thereof from the segment data storage unit 4*a*-2 (see circled numeral 4). Moreover, in the step S6, the cutin&cutout time period included in the conversion request to be transmitted to the contents servers 2-1 to 2-*n* is changed to [tel' te] in the converting apparatuses 4-1 to 4-*m* (see circled numeral 5**).

Thus, in the converting apparatus 4-1, on the basis of each contents portion information in the instruction information received from the management server 3, an editing request command designating the reference start time ts rewritten when needed and the cutin&cutout time period [ts, te] expressed with the end time te is transmitted to the contents server (contents server **2-*n* in FIG. 13**) in the URL notation in a state where the file designated by the URL is set as a file to be edited (step S7).

Accordingly, in the contents portion fetching instruction unit **4*b*-1, in a case in which the duplication decision result shows that the substance of a part of the contents portion needed for the compound contents production is duplicate with respect to the compound contents element stored and managed in the storage management unit 4*b*-4**, the fetching instruction on the contents portion non-duplicate with respect to the compound contents element is issued to the contents servers 2-1 to 2-n.

Moreover, on the basis of the duplication decision result in the contents portion fetching instruction unit 4b-1, for the portion in which the substance of the contents portion needed for the compound contents production is duplicate with respect to the compound contents element stored and managed in the storage unit 4a, the fetching instruction is not made to the contents servers 2-1 to 2-n, and the compound contents element corresponding to the duplicate portion is used for the compound contents production in the production unit 4b-2 which will be mentioned later (production step).

Still moreover, when the contents servers 2-1 to 2-n receive the instruction information serving as an editing request command transmitted from the converting apparatuses 4-1 to 4-m, the compound contents element acquisition units 2b-1 of the contents servers 2-1 to 2-n acquire the portable terminal encoding format converted compound contents element corresponding to the contents portion which is an object of the fetching instruction in the contents portion fetching instruction step to return it to the converting apparatus 4-1 to 4-m (compound contents element acquisition step, steps S8 to S11).

First, in the compound contents element acquisition unit 2b-1, by referring to the management table 2a-3, the retrieval is made as to whether or not the segment corresponding to the contents portion included in the instruction information received is stored in the segment data storage unit 2a-2 as the data returned to the converting apparatuses 4-1 to 4-m in the past (step S8).

Concretely, the compound contents element acquisition unit 2b-1 makes reference to the contents management table 2a-31 to retrieve as to whether or not there exists an URL representative of the contents corresponding to the instruction information. When the same URL as the contents portion constituting the instruction information exits in the contents management table 2a-31, there is acquired the ID of the segment management table managing the segment of this contents.

Moreover, by referring to the segment management table 2a-32 having the ID of that segment management table, a retrieval is made as to whether or not the segment including all of or a portion of cutin&cutout time period designated at the contents portion in the instruction information is stored in the segment data storage unit 2a-2.

If the result of the retrieval on the management table 2a-3 indicates the presence of the equal segment, the compound contents element acquisition unit 2b-1 acquires the segment ID number from the segment management table 2a-32 and acquires the corresponding segment from the segment data storage unit 2b-2 and further acquires the cutin&cutout time period of this segment from the segment management table 2a-32.

Still moreover, the compound contents element acquisition unit 2b-1 functioning as an editing unit extracts a needed portion (a segment corresponding to the extraction time period designated by the instruction information) from that segment to transmit it together with the actual cutin&cutout time period [ts', te'] to the instruction information transmitting converting apparatus 4-1 to 4-m (through "equality or inclusion" route of step S8 to steps S9-1, S10, S11).

The actual cutin&cutout time period signifies the extraction time period on the segment corresponding to the contents portion acquired in the compound contents element acquisition unit 2b-1.

Furthermore, if the result of the retrieval on the management table 2a-3 indicates finding a segment including a portion of the cutin&cutout time period [ts, te], for example, a segment of the same type of contents including the cutin&cutout time period [ts, te2] (te2<te), the compound contents element acquisition unit 2b-1 obtains the segment ID from the segment management table 2a-32.

Still furthermore, a needed portion (segment including the extraction time period designated by the instruction information) is acquired from the segment data storage unit 2a-2 and the cutin&cutout time period of that segment is acquired from the segment management table 2a-32. Yet furthermore, the compound contents element acquisition unit 2b-1 functioning as an editing unit extracts a needed portion from the acquired segment and transmits the extracted portion together with the actual cutin&cutout time period [ts', te2'] serving as the management data to the instruction information transmitting converting apparatus 4-1 to 4-m (steps S9-2, S10, S11).

In addition, when a decision is made, by referring to the management table 2a-3, that the segment corresponding to the contents portion included in the received instruction information is not stored in the segment data storage unit 2a-2 as the data returned to the converting apparatuses 4-1 to 4-m in the past, the compound contents element acquisition unit 2b-1 fetches the contents portion, included in the received instruction information, from the contents storage unit 2a-1.

Still additionally, the compound contents element acquisition unit 2b-1 functioning as an editing unit extracts the contents designated by the URL in the instruction information from the contents storage unit 2a-1 according to the encoding format containing a minimum of media data in which the cutin&cutout time period [ts, te] is regenerable. At this time, the compound contents element acquisition unit 2b-1 extracts a contents file together with the information (actual cutin&cutout time period [ts', te']) indicative of a given time zone [ts', te'] on the time line of the original contents.

This is because the codec utilizing the inter-frame correlation, such as MPEG, may require frame data needed for the regeneration of the leading portion of the cutin&cutout time period [ts, te].

With respect to the contents portion extracted in this way, only the media designated by the instruction information is fetched on the basis of an editing request command and the actual cutin&cutout time period [ts', te'], and a conversion into another encoding format for the portable terminal is made to achieve the conversion into a desired segment. Incidentally, the compound contents element acquisition unit 2b-1 is made to transmit each segment obtained through one extraction/conversion processing to the converting apparatuses 4-1 to 4-m.

At this time, the storage management unit 2b-2 allocates an ID to the segment obtained by the compound contents element acquisition unit 2b-1 and stores it in the segment data storage unit 2a-2 and stores the management data such as the cutin&cutout time period [ts, te] on this segment in the management table 2a-3 (through "NO" route of step S8 to step S11).

In other words, in the aforesaid steps S8 and S11, the compound contents element acquisition unit 2b-1 makes a decision on the degree of duplication (repetition) in substance between the contents portion which is an object of the fetching instruction in the contents portion fetching instruction step and the compound contents element stored and managed in the contents servers 2-1 to 2-n (in-contents-server duplication decision step) to fetch the fetching instruction contents portion from the contents storage unit 2a-1 according to the decision result and, after making a conversion into an encoding format for the portable terminal, return it as a compound contents element to the converting apparatus 4-1 to 4-*m* (compound contents element return step).

Moreover, in the aforesaid steps S8, S9-1, S9-2, S10 and S11, on the basis of the aforesaid decision result, the compound contents element acquisition unit 2*b*-1 does not fetch, of the fetching instruction contents portions, a portion duplicate in substance with respect to the stored and managed compound contents element from the contents storage unit 2*a*-1 while fetching the compound contents element corresponding to a substance duplicate portion from the contents storage unit 2*a*-2 and returning it to the converting apparatus 4-1 to 4-*m*.

Still moreover, in the aforesaid steps S8, S9-2, S10 and S11, on the basis of the aforesaid decision result, the compound contents element acquisition unit 2*b*-1 fetches, of the fetching instruction contents portions, a portion which is non-duplicated in substance with respect to the compound contents element stared and managed in the storage management unit 2*b*-2 from the contents storage unit 2*a*-1 and, after the conversion into an encoding format for the portable terminal, returns it as the compound contents element to the converting apparatus 4-1 to 4-*m*.

The processing in the converting apparatuses 4-1 to 4-*m* or the contents servers 2-1 to 2-*n* is conducted until all the segments corresponding to the contents portions constituting the instruction information received from the management server 3 reach completion through the aforesaid steps S4 to S11 in the converting apparatuses 4-1 to 4-*m*, (through "NO" route of step S12 to step S4).

Incidentally, in the converting apparatuses 4-1 to 4-*m*, although, for each substance of the contents portion constituting the instruction information, the retrieval on the management table 4*a*-1 is made or a needed editing request command is transmitted to each contents server 2-1 to 2-*n*, the present invention enables all the segment information to be searched in advance to confirm that all the contents servers in the URL notation on the contents portions constituting the compound contents are identical to each other and that the URLs are identical to each other, thus transmitting collected editing request commands to the contents servers 2-1 to 2-*n*.

Yet moreover, when all the segments corresponding to the contents portions constituting the instruction information received from the management server 3 reach completion, the production unit 4*b*-2 of the converting apparatus 4-1 to 4-*m* combines the complete segments serving as the compound contents elements according to time series on the basis of the instruction information from the management server 3 to produce compound contents oriented to the portable terminal.

Concretely, in the converting apparatuses 4-1 to 4-*m*, when a needed segment is received from each of the contents servers 2-1 to 2-*n*, the storage management unit 4*b*-4 puts the received segment together with an ID allocated thereto in the segment data storage unit 4*a*-2 and puts the management data such as the cutin&cutout time period [ts, te] on the received segment in the management table 4*a*-1.

In addition, the production unit 4*b*-2 combines the segments corresponding to the contents portions in time series according to the arrangement designated by the instruction information from the management server 3 to produce compound contents, and further conducts the filing processing. In other words, it combines the compound contents elements acquired in the converting apparatuses 4-1 to 4-*m* in time series on the basis of the instruction information from the management server 3 to produce compound contents oriented to the portable terminal (production step).

Following this, the compound contents outputting unit 4*b*-3 outputs the file data produced by the production unit 4*b*-2 to the compound contents acquisition unit 3*b*-2 of the management server 3 (through "YES" route of step S12 to step S13).

Still additionally, the management server 3 delivers the compound contents produced in the production step to the portable terminal 5. At this time, the storage management unit 3*b*-4 attaches an contents ID to the received portable-terminal-oriented compound media contents and puts it as the contents data in the contents storage unit 3*a*-2 and writes the contents ID, the data-returning converting apparatus ID, the segment management information ID and others in the contents management table 3*a*-3 in a sate associated with the contents information (step S14).

Through the above-described steps S1 to S14, the portable-terminal-oriented compound media contents are produced and delivered to the portable terminal.

Figure 14:
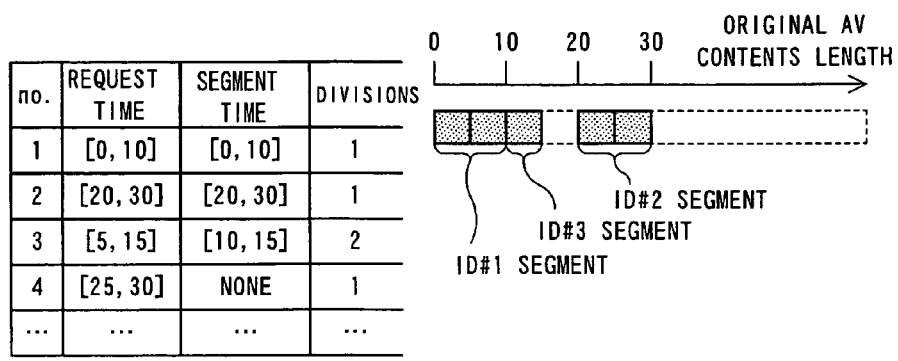

FIG. 14 is an illustration useful for explaining an example of the processing of writing the segment in the storage unit 4*a* of the storage management unit 4*b*-4 of the converting apparatus 4-1 to 4-*m* in the aforesaid step S13.

First, in the contents portion fetching instruction unit 4*b*-1 of the converting apparatus 4-1 to 4-*m*, in the case of obtaining a segment with respect to a cutin&cutout time period [0, 10] contents portion of given contents according to the instruction information (no. 1 in FIG. 14), first, by referring to the management table 4*a*-1, a retrieval is made as to whether or not a segment corresponding to the extraction time period designated in that contents is stored in the segment data storage unit 4*a*-2.

However, since this segment does not exist in the segment data storage unit 4*a*-2, a conversion request is transmitted to the contents servers 2-1 to 2-*n*. Thereafter, upon receipt of a segment from the contents servers 2-1 to 2-*n*, the ID of this segment is stored as #1.

Moreover, as with the above-mentioned case, also in the case of obtaining a segment with respect to the cutin&cutout time period [20, 30] contents portion of the same contents (no. 2 in FIG. 14), the reference to the management table 4*a*-1 is made in the contents portion fetching instruction unit 4*b*-1. However, since the result of the retrieval on the management table 4*a*-1 shows that that segment does not exist in the segment data storage unit 4*a*-2, a conversion request is transmitted to the contents servers 2-1 to 2-*n*. Still moreover, upon receipt of the corresponding segment from the contents servers 2-1 to 2-*n*, the ID of that segment is stored as #2.

In addition, in the case of obtaining a segment with respect to the cutin&cutout time period [5, 15] contents portion of the same contents (no. 3 in FIG. 14), the reference to the management table 4*a*-1 is made in the contents portion fetching instruction unit 4*b*-1 to make a retrieval as to whether or not a segment corresponding to the extraction time period designated in that contents is stored in the segment data storage unit 4*a*-2. Thus, it turns out that a segment including [5, 10] of the cutin&cutout time period [5, 15] is already stored as an ID#1 segment in the segment data storage unit 4*a*-2.

At this time, with respect to the [5, 10] portion, through the re-use of the segment of the segment ID#1, a fetching instruction on the segment of the cutin&cutout time period [10, 15] is transmitted to the contents servers 2-1 to 2-*n*. The segment returned with respect to this fetching instruction is stored in the segment data storage unit 4*a*-2 in a state where an ID#3 is allocated thereto.

Subsequently, in the case of obtaining a segment with respect to the cutin&cutout time period [25, 30] contents portion of the same contents (no. 4 in FIG. 14), when the management table 4a-1 is referred to in the contents portion fetching instruction unit 4b-1, it turns out that a segment including the entire cutin&cutout time period [25, 30] is stored in the segment data storage unit 4a-2 in a state where an ID#2 is allocated thereto, and this is re-used and a segment fetching instruction is not transmitted to the contents servers 2-1 to 2-n.

In FIG. 14, the "number of divisions" signifies the number of clocks when a segment corresponding to the extraction time period included as "request time" in the instruction information is stored (in a state divided) in the segment data storage unit 4a-2. For example, the aforesaid example indicates that the segment of cutin&cutout time period [5, 15] is stored in a state divided into two: the segment of the cutin&cutout timer period [5, 10] and the segment of the cutin&cutout timer period [10, 15].

Incidentally, in the converting apparatuses 4-1 to 4-m, because of the employment of the segment data storage unit 4a-2 as a cache, the cutin&cutout time period [ts, te] and the cutin&cutout time period [ts', te'] described in the instruction information can be different from each other. Therefore, the converting apparatuses 4-1 to 4-m can be provided with a function to adjust the presentation so that the difference between the extraction time periods does not appear in the presentation.

Figure 15:
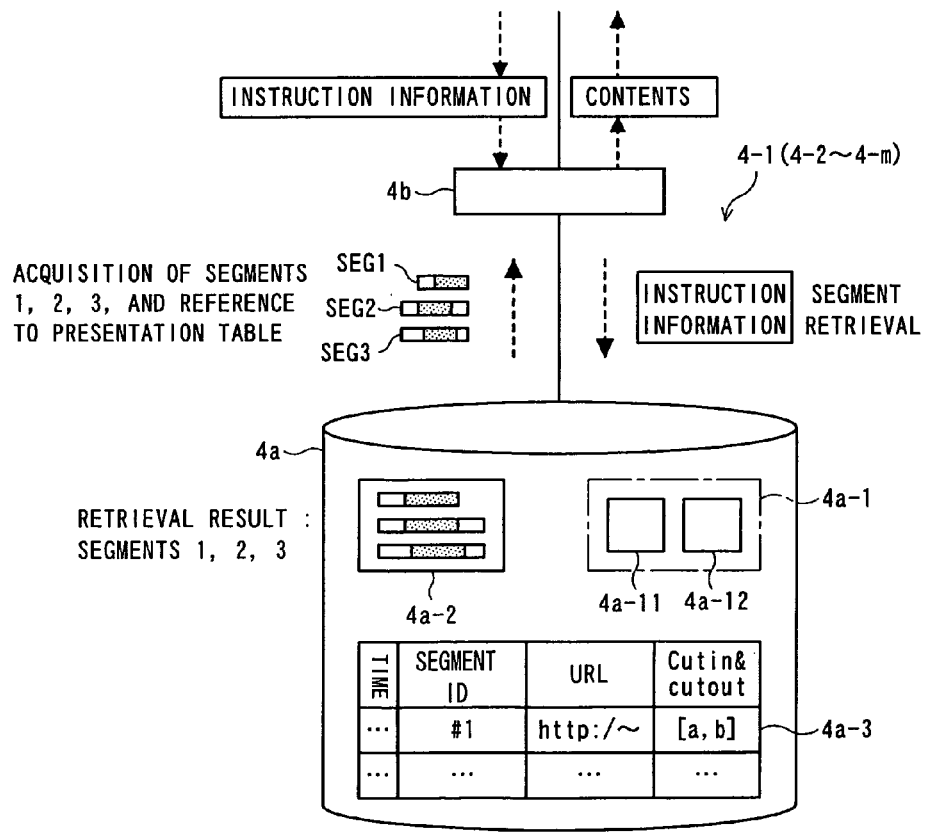

FIG. 15 is an illustration useful for explaining a function for the aforesaid presentation time control. As FIG. 15 shows, the storage unit 4a of each of the converting apparatuses 4-1 to 4-m is equipped with the management table 4a-1 and the segment data storage unit 4a-2 and further equipped with a presentation time control information table 4a-3, and the production unit 4b-2 has a function to execute the presentation time control by referring to the aforesaid table 4a-3.

For example, as shown in FIG. 15, although, in the contents portion fetching instruction unit 4b-1, the reference to the management table 4a-1 is made to acquire segments SEG1 to SEG3 corresponding to the instruction information from the segment data storage unit 4a-2, there is a case in which the cutin&cutout time period of these SEG1 to SEG3 does not agree with the cutin&cutout time period requested in the instruction information.

Concretely, although, as written in a segment management table 4a-12 shown in FIG. 16, the cutin&cutout time periods designated (requested) in the instruction information for SEG1 to SEG3 are [10, 20], [63, 73] and [7, 17], the actual cutin&cutout time periods of SEG1 to SEG3 can be [5, 20], [60, 80] and [0, 20].

In this case, in the contents portion fetching instruction unit 4b-1 of the converting apparatus 4-1 to 4-m, when the segments SEG1 to SEG3 shown in FIG. 15 are taken from the contents servers 2-1 to 2-n, the actual cutin&cutout time periods of the SEG1 to SEG3 are inputted from the contents servers 2-1 to 2-n.

Moreover, in the storage management unit 4b-4, the management data on SEG1 to SEG3 is written in the management table 4a-1, and correction information to the actual segment cutin&cutout time periods received from the contents servers 2-1 to 2-n as mentioned above, according to the cutin&cutout time periods designated in the instruction information, is written in the table 4a-3.

Accordingly, in the production unit 4b-2 of the converting apparatus 4-1 to 4-m, in the case of producing compound contents in which the correction information is written in the table 4a-3 as mentioned above, for example, as shown in FIG. 18, the respective segments SEG1 to SEG3 fetched from the segment data storage unit 4a-2 are first connected (in a state where the cutin & cutout time periods are not corrected) to each other to produce a file of a compound contents CONTa.

Figure 18:
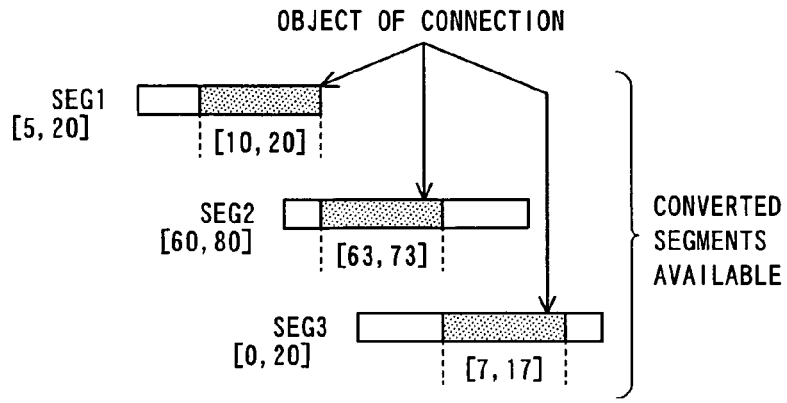
FIGS. 18 and 19 are illustrations useful for explaining the processing in a contents server in this embodiment.
Figure 18:
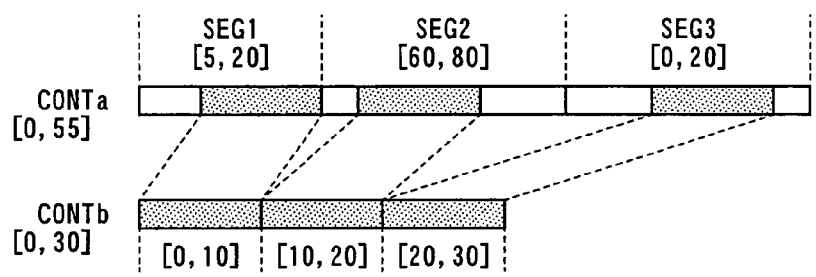

Subsequently, in the production unit 4b-2, as the header information on the produced compound contents CONTa file, the substance of the table 4a-3 shown in FIG. 17 is added to the presentation time control information, thereby, as shown in FIG. 18, forming a contents file from which only the compound contents CONTb comprising segments equivalent to the cutin&cutout time periods designated in the instruction information corresponding to SEG1 to SEG3 is substantially regenerable.

That is, when the contents file to which the aforesaid presentation time control information is added is outputted through the compound contents outputting unit 4b-3, the compound contents acquisition unit 3b-1 of the management server 3 acquires this contents file and the delivery unit 3b-2 delivers only the aforesaid CONTb on the basis of the substance of the presentation time control information according to the substance of the acquired contents file.

That is, the delivery unit 3b-2 executes, as shown in FIG. 17, the presentation time control: no display of the time zone [0, 5] in the compound contents CONTa but display of [5, 15], no display of the time zone [15, 18] but display of [18, 28], no display of the time zone [28, 42] but display of [42, 52] and no display of the time zone [52, 55], and substantially delivers CONTb for the display for only 30 seconds of the time zones [5, 15], [18, 28] and [42, 52] in CONTa.

Thus, the portable terminal 5, which receives the delivery from the delivery unit 3b-2, can regenerate the time zone [5, 15] of CONTa for the time zone [0, 10], the time zone [18, 28] in CONTa for the time zone [10, 20] and the time zone [42, 52] in CONTa for the time zone [20, 30].

Figure 19:
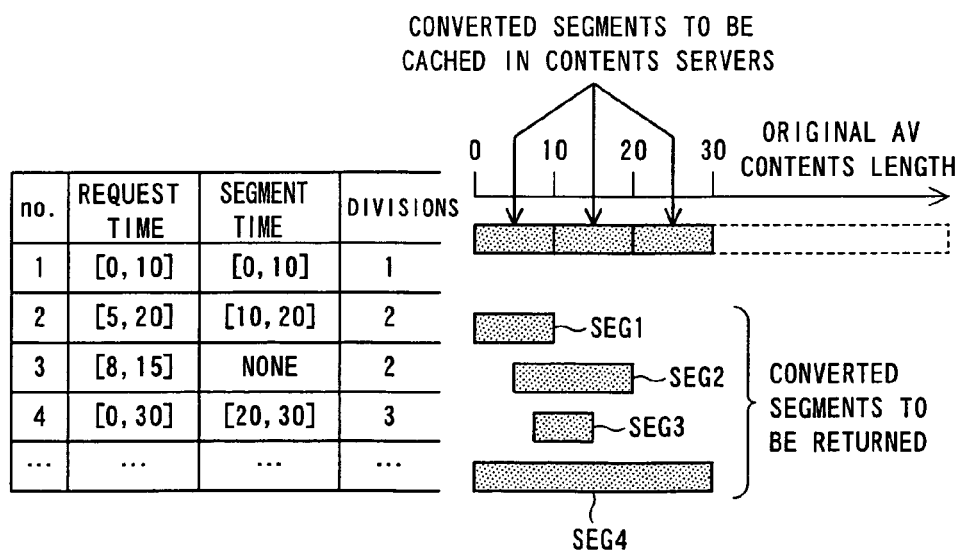

FIG. 19 is an illustration useful for explaining an example of, in the aforesaid step S11, the processing of writing segments in the storage unit 2a in the storage management unit 2b-2 of the contents servers 2-1 to 2-n.

First, let it be assumed that a fetching instruction on a segment for the cutin&cutout time period [0, 10] takes place with respect to given contents (no. 1 in FIG. 19). The compound contents element acquisition unit 2b-1 makes reference to the management table 2a-3 and, when making a decision that the corresponding segment does not exist in the segment data storage unit 2a-2, fetches a contents portion corresponding to the aforesaid extraction time period from the substance stored in the contents storage unit 2a-1 and stores the segment undergoing the encoding format conversion in the segment data storage unit 2a-2 in a state where ID#1 is attached thereto. Incidentally, the segment SEG1 of the cutin&cutout time period [0, 10] shown in FIG. 19 is returned to the fetching instruction transmitting converting apparatus 4-1 to 4-m.

Then, let it be assumed that a fetching instruction on a segment for the cutin&cutout time period [5, 20] takes place with respect to the same contents (no. 2 in FIG. 19). The compound contents element acquisition unit 2b-1 makes reference to the management table 2a-3 and, hence, makes a decision that a segment including [5, 10] of the cutin&cutout time period [5, 20] is stored as ID#1 in the segment data storage unit 2a-2, so the contents servers 2-1 to 2-n change the fetching instruction cutin&cutout time period to [10, 20].

Subsequently, the compound contents element acquisition unit 2b-1 fetches a contents portion of the aforesaid cutin&cutout time period [10, 20] from the substance stored in the contents storage unit 2a-1 and stores the segment undergoing the encoding format conversion in the segment data storage unit 2a-2 in a state where ID#2 is attached thereto. Incidentally, in FIG. 19, two segments SEG2 whose cutin & cutout time periods are [5, 10] and [10, 20] are returned to the fetching instruction transmitting converting apparatus 4-1 to 4-*m*.

Following this, let it be assumed that a fetching instruction on a segment for the cutin&cutout time period [8, 15] takes place with respect to the same contents (no. 3 in FIG. 19). The compound contents element acquisition unit 2*b*-1 makes reference to the management table 2*a*-3 and, hence, makes a decision that the segment #1 including [8, 10] of the cutin&cutout time period [8, 15] and the segment #2 including [10, 15] are stored in the segment data storage unit 2*a*-2.

Therefore, the compound contents element acquisition unit 2*b*-1 of the contents servers 2-1 to 2-*n* fetches the contents portion of the aforesaid cutin&cutout time period [8, 10] from the segment data storage unit 2*a*-2 on the basis of the segment ID#1 and fetches the contents portion of the aforesaid cutin&cutout time period [10, 15] therefrom on the basis of the segment ID#2. Incidentally, in FIG. 19, two segments SEG3 whose cutin&cutout time periods are [8, 10] and [10, 15] are returned to the fetching instruction transmitting converting apparatus 4-1 to 4-*m*.

Moreover, in the compound contents element acquisition unit 2*b*-1, let it be assumed that a fetching instruction on a segment for the cutin&cutout time period [0, 30] takes place (no. 4 in FIG. 19). The compound contents element acquisition unit 2*b*-1 makes reference to the management table 2*a*-3 and, hence, makes a decision that the segment #1 including a [0, 10] portion of the cutin&cutout time period [0, 30] and the segment #2 including a [10, 20] portion exist.

Therefore, the cutin&cutout time period which is an object of the fetching instruction is changed to [20, 30] and the contents portion of the aforesaid cutin&cutout time period [10, 20] is fetched from the substance stored in the contents storage unit 2*a*-1, and the segment undergoing the encoding formation conversion is stored in the segment data storage unit 2*a*-2 in a state where the ID#2 is attached thereto.

Still moreover, the compound contents element acquisition unit 2*b*-1 of the contents servers 2-1 to 2-*n* fetches the segment #1 and the segment #2 from the segment data storage unit 2*a*-2 to reuse them. Incidentally, in FIG. 19, three segments SEG4 whose cutin&cutout time periods are [0, 10], [10, 20] and [20, 30] are returned to the fetching instruction transmitting converting apparatus 4-1 to 4-*m*.

As described above, according to the embodiment of the present invention, the compound contents element acquisition unit 2*b*-1 of each of the contents servers 2-1 to 2-*n* fetches the compound contents element, converted in encoding format for the portable terminal, in corresponding relation to the contents portion, which is an object of the fetching instruction in the contents portion fetching instruction step, and returns it to the converting apparatuses 4-1 to 4-*m*. Therefore, in comparison with the conventional example in which the converting apparatus conducts the segment conversion processing, it is possible to reduce the transmission quantity in the networks 6*a* and 6*b*, and, as compared with the conventional system, to prevent the concentration of the processing load in the converting apparatus and distribute the processing load, thus stably providing a compound contents delivery service.

In addition, since the storage management units 2*b*-2, 3*b*-4 and 4*b*-4 of the contents servers 2-1 to 2-*n*, the management server 3 and the converting apparatuses 4-1 to 4-*m* store and mange the compound contents element to allow the reuse of the already converted segments, it is possible to eliminate the need for the redundant encoding format conversion processing in the apparatuses 2-1 to 2-*n*, 3 and 4-1 to 4-*m*, which also permits the reduction of the network transmission quantity and the reduction of the system processing load, thus shortening the compound contents production processing time.

For example, in the case of a given compound contents production request, if all the needed segments exist in the segment data storage unit 4*a*-2 serving as a cache for the converting apparatuses 4-1 to 4-*m*, the encoding formation conversion processing for the segment production becomes completely unnecessary and, in the converting apparatuses 4-1 to 4-*m*, only the filing processing on the compound contents for the portable terminal is required, which considerably shortens the processing time of the production of the compound contents oriented to the portable terminal.

Still additionally, also in the management server 3, since the portable-terminal-oriented compound contents are cached in the contents storage unit 3*a*-2, it is possible to lessen the necessity of the encoding formation conversion processing and the filing processing, thereby shortening the portable-terminal-oriented compound contents production processing time. For example, in a case in which the cache hit on a compound contents conversion request occurs in the contents storage unit 3*a*-2, the conversion processing and the filing processing becomes unnecessary at all, and the already produced portable-terminal-oriented compound contents can be acquired from the contents storage unit 3*a*-2 and returned to the portable terminal, which can quicken the response to the portable terminal.

[b] Description of Modification of the Embodiment of the Present Invention

Figure 20:
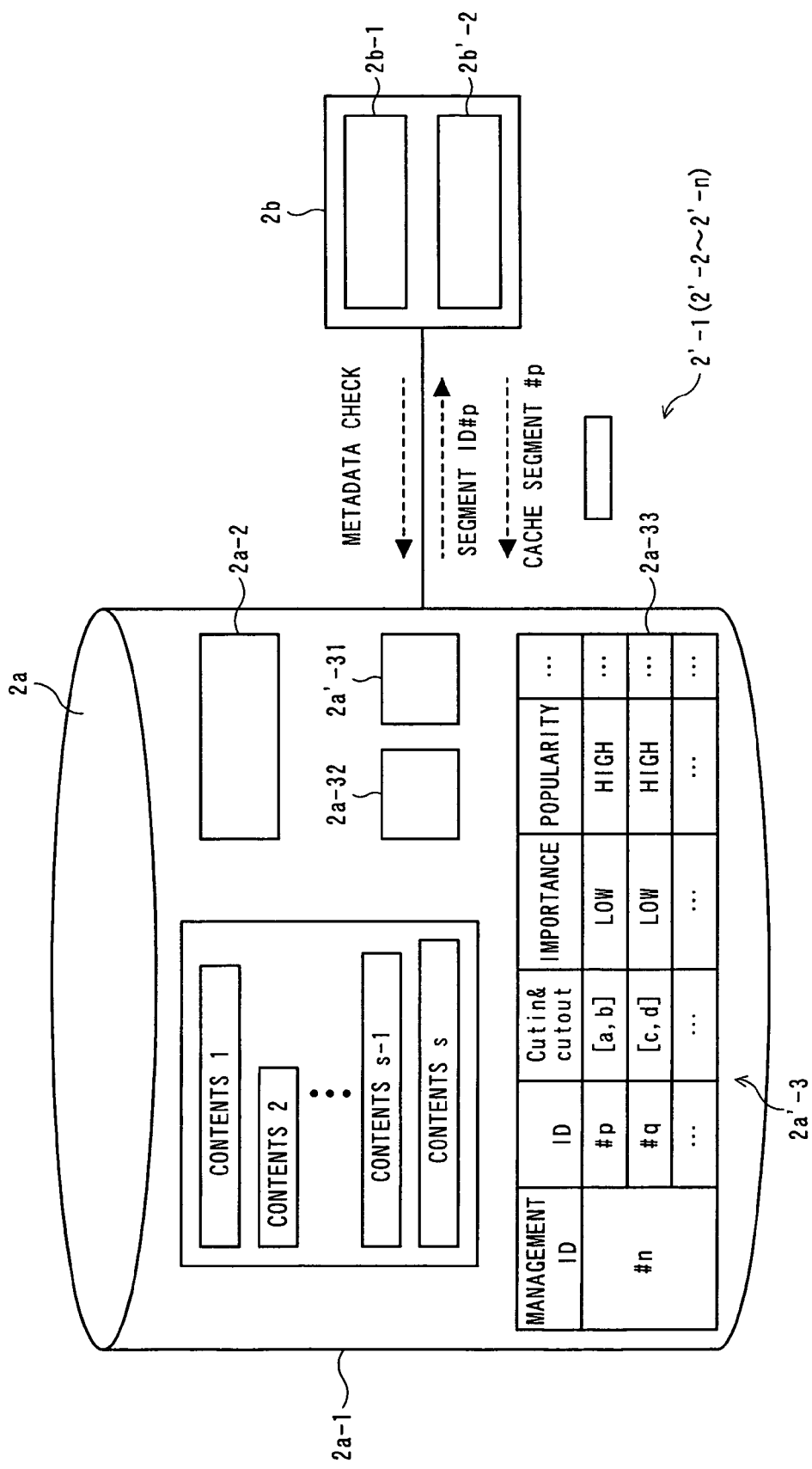
FIG. 20 is a block diagram showing a contents server according to a modification of this embodiment.
Figure 22:
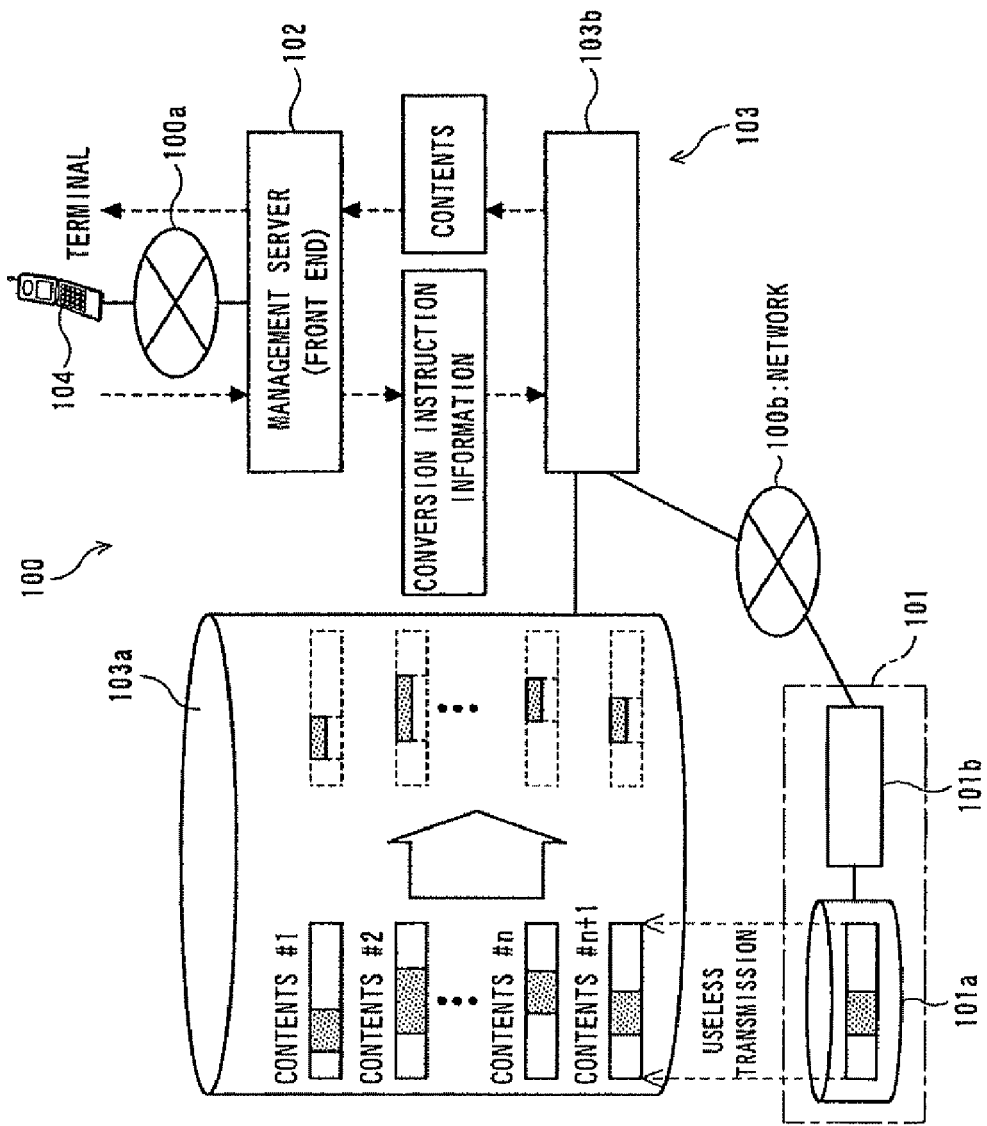
FIG. 22 is an illustration of one example of a compound contents delivery system for offering compound contents to a portable terminal.

FIG. 20 is a block diagram showing a modification of the embodiment of the present invention. This modification differs from the compound contents delivery system of FIG. 1 described above in configuration of contents servers (2'-1 to 2'-*n*), and the other configurations are the same as those in FIG. 1.

The contents server 2'-1 (2'-2 to 2'-*n*) differs from the aforesaid contents servers 2-1 to 2-*n* in configurations of storage management unit (2*b*'-2) and management table (2*a*'-3), and the other configurations are the same as those in FIG. 1.

That is, the contents server 2'-1 includes, as the management table 2*a*'-3, a metadata table 2*a*'-33 which is not provided in the aforesaid contents servers 2-1 to 2-*n* in FIG. 1. For example, as shown in FIG. 20, in the metadata table 2*a*'-33, there are written metadata such as popularity and important event.

Moreover, as with the case in FIG. 1, the storage management unit 2*b*'-2 is for storing and managing the compound contents elements to be returned to the converting apparatuses 4-1 to 4-*m*, and it is made to additionally store and manage previously, as the compound contents elements, contents portions expectable to be an object of the fetch instruction from the contents portion fetching instruction unit 4*b*-1, on the basis of the contents popularity, important event and the like constituting contents portions written in the aforesaid metadata table 2*a*'-33.

That is, since the contents with relatively high popularity are expected with high possibility to become an object of the fetching instruction in the contents portion fetching instruction unit 4*b*-1, the storage management unit 2*b*'-2 fetches it as a contents portion from the contents storage unit 2*a*-1 in advance and, after the conversion into an encoding formation for the portable terminal, stores it as a compound contents element in the segment data storage unit 2*a*-2.

In this case, as shown in FIG. 21, a contents management table 2a'-31 is made to allocate the metadata table ID for each contents to be managed and manage it for the association with the metadata table 2a'-33.

Still moreover, the storage management unit 2b'-2 of the contents servers 2'-1 to 2'-n periodically obtains information on the popularity or importance of the segment from the metadata table 2a'-33. For example, as shown in FIG. 20, the storage management unit 2b'-2 can retrieve a high-popularity segment ID#p to obtain the cutin&cutout information on this segment. Yet moreover, the cutin&cutout time of the segment thus request-expected in advance is acquired from the metadata table 2a'-33 and, after the encoding formation conversion, the data is stored in the segment data storage unit 2a-2.

For the popularity to be used in an index used in the aforesaid metadata table 2a'-33 including the aforesaid popularity and others, through the use of the statistic to be obtained in the form of the results of the delivery to personal computers, the discrimination is made between a portion expected in portable-terminal-oriented conversion request in advance and a portion other than it.

In addition to the contents portions being an object of the fetching instruction from the contents portion fetching instruction unit 4b-1 in the past, the data on the contents with relatively high popularity can be stored in the segment data storage unit 2a-2 as needed to be fetched faster than the fetching from the contents storage unit 2a-1.

Therefore, also in this modification, the compound contents element acquisition unit 2b-1 of each of the contents servers 2'-1 to 2'-n can acquire the compound contents element, converted in encoding format for the portable terminal, in corresponding relation to the contents portion which is an object of the fetching instruction in the contents portion fetching instruction step to return it to the converting apparatuses 4-1 to 4-m. In addition to the advantages similar to those of the above-described embodiment, this modification can reduce the necessity of the encoding conversion processing in the contents servers 2'-1 to 2'-n and can shorten the time until the reply to the converting apparatuses 4-1 to 4-m after the receipt of a segment request.

The present invention is not limited to the embodiment specifically described above, and variations and modifications can be made without departing from the scope of the present invention.

What is claimed is:

1. A compound contents delivery method of a delivery system having a plurality of contents servers to which a plurality of contents having a length of time are distributed to be stored in their contents storage units, respectively, a management server for managing delivery of contents to a portable terminal, and an intermediate apparatus for mediating supply of contents from said plurality of contents servers to said management server, where the delivery system deliveries a compound contents to the portable terminal, said method comprising:

outputting, in said management server, outputting instruction information for production of the compound contents to said intermediate apparatus based on a substance of said compound contents to be produced, the compound contents being a combination of a plurality of contents portions in time series, and each contents portions being partially fetched in time dimension from one of the contents stored in one of the storage units;

executing a contents portion fetching instruction, in said intermediate apparatus, instructing said contents servers to fetch contents portions needed for production of the compound contents according to said instruction information outputted;

executing a compound contents element acquiring and transmitting, in each of said contents servers, acquiring a compound contents element in corresponding relation to said contents portion which is an object of the fetching instruction in said contents portion fetching instruction, converting the acquired compound contents element in an encoding format for said portable terminal, and transmitting the acquired and converted compound contents element to said intermediate apparatus;

executing a production operation of, in said intermediate apparatus, combining said compound contents elements received from said contents servers according to time series based on instruction information from said management server thereby producing compound contents oriented to said portable terminal; and delivering, in said management server, said compound contents produced in said production operation to said portable terminal, and wherein, in said compound contents element acquiring, said intermediate apparatus stores and manages said compound contents elements returned from said contents server in the past, and said contents portion fetching instruction includes an in-intermediate-unit duplication decision operation of obtaining information for specifying contents portion needed for the compound contents production from said instruction information and making a decision as to a degree of duplication in substance between said contents portion needed for the compound contents production and said compound contents element stored and managed in said intermediate apparatus; and providing a fetching instruction to said contents server based on a decision result of said in-intermediate-unit duplication decision operation, wherein, in said executing of the fetching instruction, based on the decision result in said in-intermediate-unit duplication decision operation, said fetching instruction is not given to said contents server with respect to a duplicate portion between a substance of said contents portion needed for the compound contents production and said compound contents element stored and managed, and a compound contents element corresponding to said duplicate portion is used in producing said compound contents in said production.

2. A compound contents delivery method according to claim 1, wherein said management server is made to store and manage said compound contents previously received from said intermediate apparatus and said instruction information which corresponds to said compound contents by association, and said method further comprises:

making a decision as to an identity between said instruction information produced in said instruction information production and said instruction information stored in said management server; and executing an in-management-server first control, when the decision shows the produced instruction information is identical with said instruction information stored and managed in said management server, using said compound contents stored in a state associated with the stored instruction information as said compound contents to be delivered to said portable terminal in said delivering and, when the decision shows no identity therebetween, transmitting the produced instruction information to said intermediate apparatus.

3. A compound contents delivery method according to claim 2, wherein a plurality of intermediate apparatuses each identical with said intermediate apparatus are provided, and in said decision as to identity, a decision is additionally made as to the degree of similarity between the produced instruction information and said instruction information stored in said management server, and in said in-management-server first control, when a decision result in said decision as to identity shows that the produced instruction information is not identical with said instruction information stored and managed in said management server, the produced instruction information is transmitted to said intermediate apparatus to which compound contents information is returned with respect to, of said instruction information stored and managed in said management server, said instruction information which is decided to be most similar to the produced instruction information.

4. A compound contents delivery method according to claim 1, wherein a plurality of intermediate apparatuses each identical with said intermediate apparatus are provided, and in said management server, a processing load monitoring is implemented to monitor a processing load in said converting unit and an in-management-server second control is provided to transmit said instruction information produced in said instruction information production to said converting unit having a smallest processing load based on a monitor result from said processing load monitoring.

5. A compound contents delivery method according to claim 1, wherein, in said executing of the fetching instruction, on the basis of a decision result in said in-intermediate-unit duplication decision, when the substance of a portion of the contents portion needed for the compound contents production is duplicate with respect to said compound contents element stored and managed, said fetching instruction on a contents portion non-duplicate with respect to said compound contents element is given to said contents server.

6. A compound contents delivery method according to claim 1, wherein each of said contents servers stores and manages said compound contents element returned in said compound contents element acquiring in the past and said compound contents element acquiring includes:
an in-contents-server duplication decision operation of making a decision on the degree of the duplication in substance between the contents portion which is an object of said fetching instruction in said contents portion fetching instruction and said compound contents element stored and managed in said contents server; and
a compound contents element reply operation of, on the basis of a decision result in said in-contents-server duplication decision, fetching said contents portion, which is an object of said fetching instruction, from said contents storage unit and making a conversion into an encoding format for said portable terminal to return it as a compound content element to said intermediate apparatus.

7. A compound contents delivery method according to claim 6, wherein, in said compound contents element reply operation, on the basis of the decision result in said in-contents-server duplication decision operation, of said contents portion which is an object of said fetching instruction in said contents portion fetching instruction, a portion duplicate in substance with respect to said compound contents element stored and managed is not fetched from said contents storage unit while a compound contents element corresponding to the substance duplicate portion is returned to said intermediate apparatus.

8. A compound contents delivery method according to claim 6, wherein, in said compound contents element reply operation, on the basis of the decision result in said in-contents-server duplication decision operation, of said contents portion which is an object of said fetching instruction in said contents portion fetching instruction operation, a portion non-duplicate in substance with respect to said compound contents element stored and managed is fetched from said contents storage unit and, after a conversion is made into an encoding format for said portable terminal, the non-duplicate portion is returned as a compound contents element to said intermediate apparatus.

9. A compound contents delivery method according to claim 1, wherein, in said contents server, on the basis of popularity, important event and the like, a contents portion expected to be an object of said fetching instruction in said contents portion fetching instruction is stored and managed as said compound contents element in advance.

10. A compound contents delivery method according to claim 1, wherein each of said contents distributed to said plurality of contents servers includes data having a time zone including voice data or motion picture data and said contents portion is arranged through the use of the voice or motion picture data partially extracted from said time zone.

11. A compound contents delivery method according to claim 10, wherein, in said contents portion fetching instruction in said intermediate apparatus, said contents portion for the compound contents production which is an object of said fetching instruction is designated by designating information about a service location on the internet having said contents portion, a time zone of said contents portion, a media assortment or an encoding condition after the encoding conversion.

12. A method of contents delivery in a delivery system having a plurality of contents servers, comprising:
outputting instruction information for production of contents based on a substance of said contents to be produced;
fetching contents portions corresponding to compound contents in response to the instruction information and converting the contents portions fetched in an encoding format for a portable terminal;
acquiring a compound contents element in corresponding relation to said contents portion which is an object of the fetching in a contents portion fetching instruction;
producing compound contents oriented to said portable terminal by combining the contents portions according to time series based on the instruction information; and
delivering the contents portions to the portable terminal, where the compound contents is a combination of a plurality of contents portions in time series, and each contents portions is partially fetched in time dimension from one of contents stored, and
said fetching designates only content portions that is not stored as having been previously returned and having a degree of duplication in substance between content requested in the instruction information and stored compound contents element,
said fetching is provided based on a decision result that designates the content portions and said fetching is not given with respect to a duplicate portion between a substance of said content requested and said compound contents element stored and managed, and a compound contents element corresponding to said duplicate portion is used in producing said compound contents in said production.

13. A compound contents delivery system including a plurality of contents servers to which a plurality of contents are distributed to be stored in their contents storage units, respectively, a management server for managing delivery of contents to a portable terminal, and an intermediate apparatus for mediating supply of contents from said plurality of contents servers to said management server, where the delivery system deliveries a compound contents to the portable terminal said management server comprising:

a compound contents acquisition unit for acquiring said compound contents through outputting instruction information for production of said compound contents to said intermediate apparatus based on a substance of said compound contents to be produced, the compound contents being a combination of a plurality of contents portions in time series, and each contents portions being partially fetched in time dimension from one of the contents stored in one of the storage units, and a delivery unit for delivering said compound contents acquired by said compound contents acquisition unit to said portable terminal; and said intermediate apparatus comprising:

a contents portion fetching instruction unit for instructing said contents servers to fetch contents portions needed for production of the compound contents when receiving a request for the compound contents production and said instruction information from said compound contents acquisition unit, a production unit for combining compound contents elements received from said contents servers according to time series based on said instruction information from said management server thereby producing compound contents oriented to said portable terminal, a compound contents outputting unit for outputting said compound contents produced in said production unit to said compound contents acquisition unit of said management server; and each of said contents servers comprising:

a compound contents element acquiring and transmitting unit, for acquiring a compound contents element in corresponding relation to said contents portion which is an object of the fetching instruction in said contents portion fetching instruction unit, converting the acquired compound contents element in an encoding format for said portable terminal, and transmitting the acquired and converted compound contents element to said intermediate apparatus, and wherein when acquiring said compound contents element, compound contents elements returned from said contents servers in the past is stored, contents portion needed for the compound contents production from said instruction information is specified and a degree of duplication in substance between said contents portion needed for the compound contents production and said compound contents element stored is determined, and a fetching instruction is provided to said contents server based on a decision result of said determination, wherein, in said executing of the fetching instruction, based on the decision result in said duplication decision operation, said fetching instruction is not given to said contents server with respect to a duplicate portion between a substance of said contents portion needed for the compound contents production and said compound contents element stored and managed, and a compound contents element corresponding to said duplicate portion is used in producing said compound contents in said production.

14. A compound contents delivery system according to claim 13, wherein said management server includes an in-management-server storage management unit for storing and managing compound contents returned from said intermediate apparatus in corresponding relation to said instruction information in a state where said compound contents are associated with said instruction information.

15. A compound contents delivery system according to claim 13, wherein said intermediate apparatus includes an in-intermediate-apparatus storage management unit for storing and managing said compound contents element returned from said contents server through the use of said compound contents element acquisition unit.

16. A compound contents delivery system according to claim 13, wherein each of said contents servers includes a storage management unit for storing and managing a compound content element from said compound contents element acquisition unit.

* * * * *